US007880929B2

(12) United States Patent
Kaneko et al.

(10) Patent No.: US 7,880,929 B2
(45) Date of Patent: Feb. 1, 2011

(54) IMAGE DATA CONVERSION INTO SUBSTITUTE INK QUANTITIES TO DIFFERENTIATE AN AREA IN A FIRST IMAGE WHERE A SECOND IMAGE IS EMBEDDED

(75) Inventors: Nao Kaneko, Suwa (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 526 days.

(21) Appl. No.: 12/013,841

(22) Filed: Jan. 14, 2008

(65) Prior Publication Data
US 2008/0170269 A1 Jul. 17, 2008

(30) Foreign Application Priority Data
Jan. 15, 2007 (JP) ............... 2007-005464

(51) Int. Cl.
*H04N 1/387* (2006.01)
*H04N 1/407* (2006.01)
*H04N 1/60* (2006.01)
*B41M 3/10* (2006.01)
*H04N 1/52* (2006.01)
*B41J 2/01* (2006.01)
*B41J 2/205* (2006.01)

(52) U.S. Cl. .................. 358/1.9; 358/523; 358/3.28; 358/1.18; 358/502; 358/521; 358/534; 347/15; 347/107

(58) Field of Classification Search ................. 358/1.9, 358/3.28, 3.06, 3.13, 3.23, 521, 523, 534, 358/535, 502, 1.18; 347/3, 12, 13, 15, 40, 347/42, 43, 105–107
See application file for complete search history.

(56) References Cited

U.S. PATENT DOCUMENTS

| 7,304,770 | B2 * | 12/2007 | Wang et al. ............. 358/3.28 |
| 7,742,196 | B2 * | 6/2010 | Uchida et al. ........... 358/3.28 |
| 2009/0067006 | A1 * | 3/2009 | Kobayashi et al. ...... 358/3.28 |

FOREIGN PATENT DOCUMENTS

| JP | 2000-069308 | 3/2000 |
| JP | 2001-191565 | 7/2001 |
| JP | 2001-223879 | 8/2001 |
| JP | 2005-249968 | 9/2005 |
| JP | 2006-095947 | 4/2006 |

* cited by examiner

*Primary Examiner*—Scott A Rogers
(74) *Attorney, Agent, or Firm*—Workman Nydegger

(57) ABSTRACT

An image data conversion apparatus for embedding a second image into image data corresponding to a first image, comprising an embedded image acquisition unit that acquires a second image for embedding in the first image, an embedment area acquisition unit that receives a location of an embedment area where the second image may be embedded in the first image, an ink set memory unit that stores a first and second set of inks and associated quantities, wherein the second set of inks and may be substituted for the first set of inks, and an ink amount data conversion unit that converts the image data into converted ink quantity data that corresponds to the image data such that the second image embedded in the first image can be observed by making a differentiation between portions of the first image where the first and second set of ink are used.

18 Claims, 20 Drawing Sheets

FIG. 9

SIXTY-FOUR PIXELS →

SIXTY-FOUR PIXELS ↓

| | | | | | | | | | | | | | | | | |
|---|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 |
| 123 | 33 | 127 | 181 | 83 | 155 | 105 | 140 | 30 | 150 | 119 | 182 | 40 | 89 | 220 | 163 | 44 |
| 219 | 91 | 237 | 22 | 121 | 198 | 61 | 188 | 111 | 215 | 3 | 98 | 201 | 140 | 10 | 95 | |
| 11 | 195 | 53 | 136 | 227 | 37 | 247 | 12 | 233 | 52 | 192 | 135 | 32 | 246 | 113 | 194 | |
| 99 | 144 | 107 | 184 | 68 | 172 | 97 | 151 | 77 | 173 | 84 | 237 | 123 | 61 | 167 | 46 | |
| 225 | 40 | 251 | 6 | 217 | 116 | 28 | 196 | 125 | 35 | 207 | 17 | 153 | 203 | 24 | | |
| 87 | 169 | 78 | 162 | 59 | 146 | 211 | 64 | 254 | 142 | 72 | 178 | 87 | 118 | 228 | | |
| 190 | 15 | 202 | 111 | 238 | 19 | 93 | 169 | 8 | 110 | 221 | 49 | 249 | 2 | 144 | | |
| 74 | 246 | 134 | 43 | 174 | 128 | 230 | 50 | 216 | 154 | 26 | 168 | 79 | 184 | | | |
| 176 | 30 | 98 | 219 | 86 | 34 | 139 | 195 | 101 | 56 | 241 | 127 | 213 | 37 | | | |
| 69 | 148 | 196 | 2 | 159 | 247 | 89 | 11 | 136 | 185 | 92 | 14 | 108 | | | | |
| 187 | 41 | 126 | 226 | 106 | 57 | 190 | 115 | 235 | 36 | 208 | 121 | 229 | | | | |
| 81 | 214 | 92 | 53 | 145 | 204 | 27 | 166 | 74 | 157 | 82 | 165 | 31 | | | | |
| 232 | 21 | 170 | 240 | 13 | 132 | 252 | 51 | 222 | 4 | 245 | 48 | | | | | |
| 130 | 155 | 55 | 115 | 183 | 78 | 122 | 196 | 102 | 180 | 65 | 173 | | | | | |
| 72 | 252 | 100 | 211 | 45 | 231 | 20 | 148 | 39 | 133 | 205 | | | | | | |
| 202 | 32 | 179 | 5 | 163 | 95 | 191 | 86 | 239 | 111 | 29 | | | | | | |
| 104 | 143 | 58 | 243 | 70 | 218 | 63 | 161 | 9 | 209 | | | | | | | |
| 64 | 236 | 129 | 110 | 151 | 25 | 199 | 49 | 172 | 68 | | | | | | | |
| 171 | 17 | 208 | 38 | 225 | 131 | 99 | 254 | 113 | | | | | | | | |
| 80 | 191 | 87 | 174 | 76 | 189 | 13 | 143 | | | | | | | | | |
| 247 | 35 | 152 | 2 | 248 | 55 | | | | | | | | | | | |
| 140 | 108 | 197 | 127 | 96 | | | | | | | | | | | | |
| 13 | 215 | 46 | 229 | | | | | | | | | | | | | |
| 164 | 90 | 180 | | | | | | | | | | | | | | |
| 52 | 253 | | | | | | | | | | | | | | | |
| 205 | | | | | | | | | | | | | | | | |

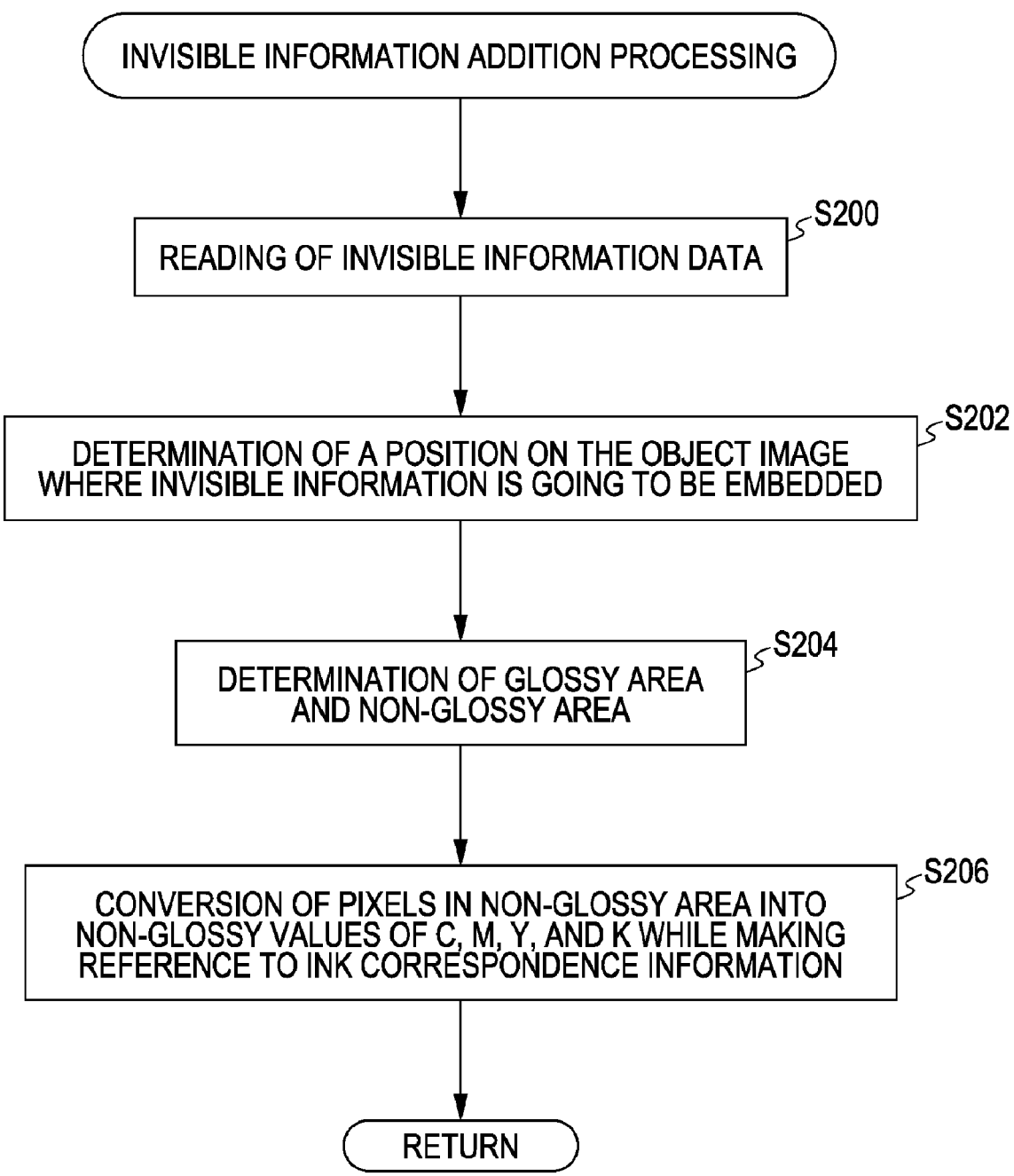

FIG. 13A
EPS
FIG. 13B
FIG. 13C
12/01/2006
FIG. 13D
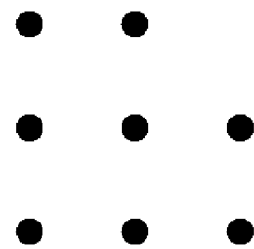

NON-GLOSSY AREA    GLOSSY AREA

NON-GLOSSY AREA    GLOSSY AREA (C, M, Y, K) = (0, 0, 0, 255)    (C, M, Y, K) = (0, 0, 0, 255)

CONVERSION IS PERFORMED WHILE MAKING REFERENCE TO INK CORRESPONDENCE INFORMATION (C, M, Y, K) = (255, 255, 255, 0)    (C, M, Y, K) = (0, 0, 0, 255)
REDUCED SURFACE GLOSS    GREATER SURFACE GLOSS

SAME COLOR

COMPOSITE BLACK     COMPOSITE BLACK     REAL BLACK
+
REAL BLACK

REAL BLACK     COMPOSITE BLACK

COMPOSITE BLACK     INTERMEDIATE GRADATIONS     REAL BLACK

IMAGE DATA CONVERSION INTO SUBSTITUTE INK QUANTITIES TO DIFFERENTIATE AN AREA IN A FIRST IMAGE WHERE A SECOND IMAGE IS EMBEDDED

BACKGROUND

The entire disclosure of Japanese Patent Application No. 2007-005464, filed Jan. 15, 2007 is expressly incorporated herein by reference.

1. Technical Field

The present invention relates to a technique for embedding invisible information in images.

2. Related Art

A variety of techniques have been developed for embedding invisible information in images. For example, Japanese Patent No. JP-A-2005-249968 discloses a technique for embedding a specific type of information that is visible only by using infrared radiation, which is achieved by printing the images with a special toner that is sensitive to infrared light. In another example known in the related art which is described in Japanese Patent No. JP-A-2001-191565, the invisible information is embedded by making the smoothness of one area of specially coated paper different from another area of the paper by applying a heat treatment to the specified area.

One disadvantage of the methods of the related art, however, is the methods are not user-friendly. For example, the first example of the related art described with reference to Japanese Patent No. JP-A-2005-249968, the method requires a special toner for embedding the invisible information into the images. In addition, the technique further requires a dedicated infrared scanning apparatus for reading out the embedded invisible information. In the second example of the prior art described with reference to Japanese Patent No. JP-A-2001-191565 also requires a special type of paper that is capable of changing its surface status when a heat treatment is applied thereto. Thus, as described above, the known techniques for handling invisible information require special dedicated apparatuses or the like, meaning that it is difficult for a user to create invisible information into images that may be subsequently read.

BRIEF SUMMARY OF THE INVENTION

One advantage of aspects of the invention a novel and inventive technique that makes it possible to incorporate invisible information into an image in an easy, user-friendly manner that does not require any special reading apparatus, dedicated paper, or the like.

In order to provide a solution to at least a part of the above-identified problems, one aspect of the invention is a image data conversion apparatus that is capable of receiving image data and converting the image data into converted ink quantity data that corresponds to a plurality inks and associated quantities that may to be used to print a first image. The image data conversion apparatus comprises an embedded image memory section that is capable of storing a second image that is to be embedded into the first image, an embedment area acquisition section that is capable of acquiring a setting determination indicating the location of an embedment area where the second image may be embedded in the first image, an ink amount set memory section that is capable of storing a first set of ink quantity data that is associated with the plurality of inks and associated quantities along with a second set ink quantity data that is associated with a second plurality of inks and associated quantities that can be used as a substitute for the first set of inks, and an ink amount data conversion section that is capable of converting the image data into the converted ink quantity data corresponding to the first image data such that the second image is embedded in the first image and can be recognized by making a differentiation between a portion of the first image where the first set of ink is used and another portion where the second set of ink amount is used.

A second aspect of the invention is a method corresponding to the image data conversion apparatus which is capable of embedding a second image into a first image, the method comprising storing the second image that is to be embedded into the first image, acquiring a determination regarding the location of an embedment area where the second image will be embedded in the first image, storing a first set of ink quantity data associated with a plurality of inks and associated quantities along with a second set of ink quantity data that is associated with a second plurality of inks and quantities that can be used as a substitute for the first set of inks, converting the first image data into converted ink quantity data such that the second image is embedded in the embedment area and can be recognized by making a differentiation between a portion of the first image where the first set of ink is used and another portion where the second set of ink is used.

The invention can also be implemented by means of a computer program for executing the image data conversion method described above, where the computer loads the program so as to execute predetermined functions thereof. Therefore, the invention may be implemented and/or embodied by means of the following program or a storage medium that stores the method.

BRIEF DESCRIPTION OF THE DRAWINGS

The invention will be described with reference to the accompanying drawings, wherein like numbers reference like elements.

FIG. 9 enlarged view of a dither matrix;

FIG. 12 illustrates the process of adding invisible information according to an image according to the exemplary embodiment of the invention;

FIG. 13 is a set of explanatory diagrams comprising examples of invisible information data that may be embedded into an object image;

DESCRIPTION OF EXEMPLARY EMBODIMENTS

In order to clarify the technical concepts of the present invention described above, exemplary embodiments of the invention are explained in chapters and sections.

I. General Overview of Exemplary Embodiments

Figure 1:
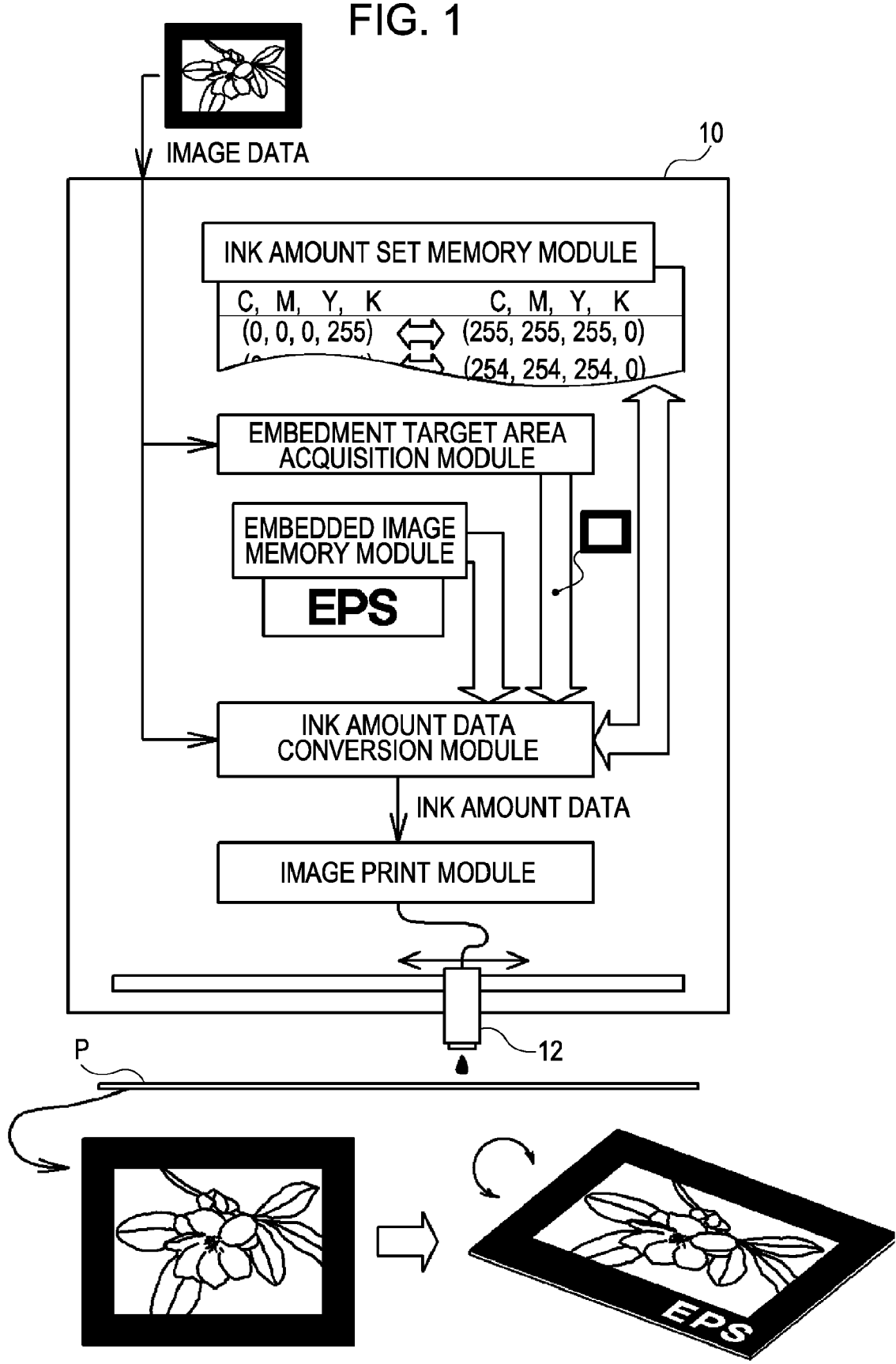
FIG. 1 illustrates the general overview of a printing apparatus according to an exemplary embodiment of the invention.

Prior to the detailed explanation of the exemplary embodiments of the invention, a general overview will be provided with reference to FIG. 1. FIG. 1 is an explanatory drawing that illustrates the general overview of a printing apparatus 10 according to the present embodiment of the invention. The printing apparatus 10 illustrated in the drawing is provided with a print head 12 that is capable of discharging ink as ink drops. The printing apparatus 10 according to one embodiment of the invention is configured as an ink-jet printer that is capable of printing an image by discharging ink drops from the print head 12 so as to form ink dots on a printing medium P, that is, a sheet of paper, while reciprocating the print head 12 on the printing medium P.

As illustrated in the drawing, various kinds of modules are built in the printing apparatus 10, including an "embedded image memory module", "embedment target area acquisition module", "ink amount set memory module", "ink amount data conversion module", and "image print module", although the printing apparatus 10 is not limited thereto. In this context, the term "module" means, conceptually, a series of process steps that are internally performed by the printing apparatus 10 in order to perform image printing. These modules are divided according to their respective functions. Accordingly, the "module" may be actually implemented as a part of a program, logic circuit having a specific function, or some combination of the above.

As illustrated in FIG. 1, the "embedded image memory module" is capable of storing an image to be embedded into another image. In this example, the image to be embedded is a "EPS" logo. The "ink amount set memory module" stores a plurality of amounts of ink for each of the ink colors of C, M, Y, and K, along with another plurality of amounts of ink which can be used as a substitute for the first set of ink amounts. In this example, there is one-to-one correspondence between the amounts of ink for the first set of ink and the second set of ink amounts that are stored in the module. For example, referring to FIG. 1, the "ink amount set memory module" stores two sets of ink amounts, that is, the first set of (C, M, Y, K)=(0, 0, 0, 255) and the second set of (C, M, Y, K)=(255, 255, 255, 0), so that the ink sets correspond to each other. It should be noted that one of these sets could be used as a substitute for the other because, in the above example, both of the first and second set of ink amounts result in a black color.

After receiving the image data, the modules in the printing apparatus 10 perform their respective functional operations as described below. First, the "embedment target area acquisition module" determines the location of a target area where the image may be embedded, hereafter referred to as an "embedment target area." Next, the "ink amount data conversion module" converts the received image data into ink amount data. In order to convert the image data into the ink amount data, the ink amount data conversion module determines the first and second sets of ink amounts so that the amounts correspond to each other. The module uses the data stored in the "embedded image memory module" and the "ink amount set memory module" in order to obtain a portion of the image data that will be printed out at the embedment target area as determined by the "embedment target area acquisition module." For example, as shown in FIG. 1, the ink amount data conversion module uses one set of ink amounts comprising (0, 0, 0, 255) for the "EPS" logo, and uses a second set of corresponding ink amounts comprising (255, 255, 255, 0) for the background portion of the embedded image. After converting the received image data into the ink amount data, the ink amount data conversion module supplies the converted ink amount data to the "image print module," where the "image print module" forms ink dots in accordance with the supplied ink amount data in order to output a printed image.

At first glance, the resulting printed image looks no different than any other printed image. However, upon closer inspection, it is possible to perceive an embedded image because two different sets of ink are used in the embedment area, one set which corresponds to the embedded image, and a second set which is used for the remaining background portion. Thus, by careful observation, one may recognize the embedded image due to the subtle difference in surface gloss or reflected light color of the embedded image, depending on an observation angle. Moreover, the embedded image could be recognized on the basis of the differing color as perceived under different light source conditions.

Thus, the printing apparatus 10 of the present embodiment of the invention is capable of embedding an image into another image such that the embedded image is not readily perceivable, or "invisible", but could be recognized with the unaided eye upon closer observation. In addition, the printing apparatus 10 is capable of printing an image with invisible embedded information in a simple manner without requiring any special ink, printing paper, or the like.

In the following description, a further detailed explanation of the printing apparatus 10 according to the invention is given, using exemplary embodiments of the invention.

II. Apparatus Configuration

A. General Configuration of Apparatus

Figure 2:
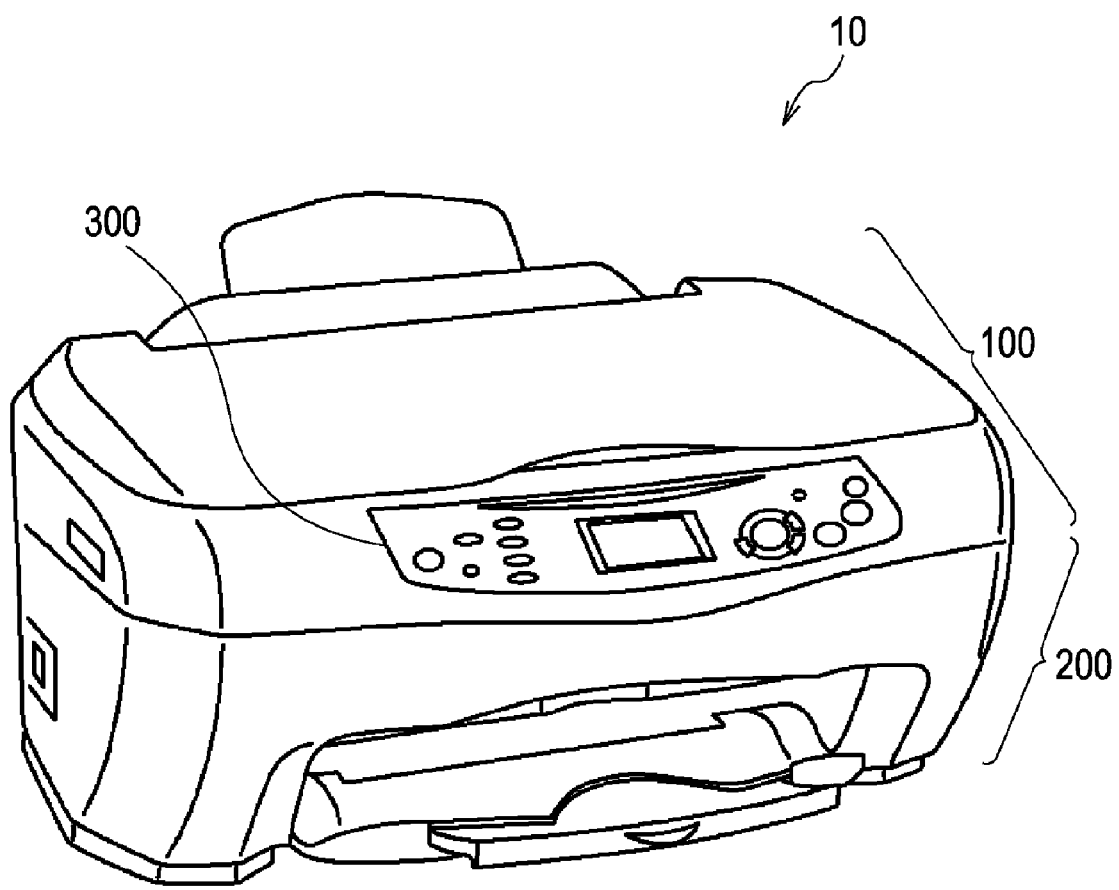
FIG. 2 is a perspective view of a printing apparatus according to the exemplary embodiment of the invention.

FIG. 2 is a perspective schematic view of the an exemplary printing apparatus 10. As illustrated in the drawing, the printing apparatus 10 is provided with a scanning unit 100, a printing unit 200, and an operation panel 300 that is used for controlling the operational settings of the scanning unit 100 and the printing unit 200. The scanning unit 100 has a scanning function that is capable of reading and capturing a printed image so as to create image data. The printing unit 200 has a printing function that is capable of printing an image on a printing medium based on the received image data. In addition to the above, the scanning unit 100 and the printing unit 200 described above are capable of working in combination in order to perform a copying function by capturing an image that is scanned from an original copy at the scanning unit 100 and printing a copy of the captured image using the printing unit 200. That is, the printing apparatus 10 according to the present embodiment of the invention is configured to be a scanner/printer/copier multifunction apparatus that is capable of supporting a scanning function, a printing function, and a copying function with a single integrated configuration. Herein, the apparatus is referred to as an "SPC multifunction apparatus."

Figure 3:
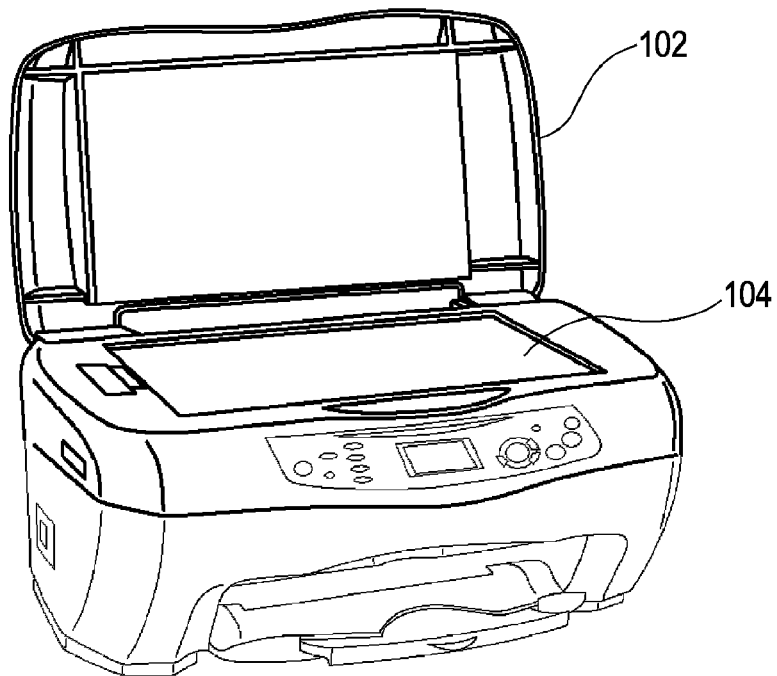
FIG. 3 illustrates an example of the printing apparatus according to the exemplary embodiment of the invention with its original glass plate cover opened so that a scanning target original image can be placed thereon.

FIG. 3 is an explanatory diagram that schematically illustrates an example of the printing apparatus 10 when the glass plate cover 102 held in an open state. The original glass plate cover 102, which is provided at the upper portion of the printing apparatus 10, is opened so that an image can be placed thereon. As illustrated in the drawing, a transparent original glass plate 104 appears after the original glass plate cover 102 has been opened. Various kinds of structural components, the combination of which offers the scanning function, are provided under the transparent original glass plate 104, forming the inner configuration of the printing apparatus 10. A further explanation of these structural components will described below.

The scanning of the original image is conducted in the following steps. First, as shown in the FIG. 3, the original glass plate cover 102 is opened. Then, an image is placed on the transparent original glass plate 104. After closing the original glass plate cover 102, a user-operator uses the buttons provided on the operation panel 300. Through this process, the image is captured and converted into image data.

Figure 4:
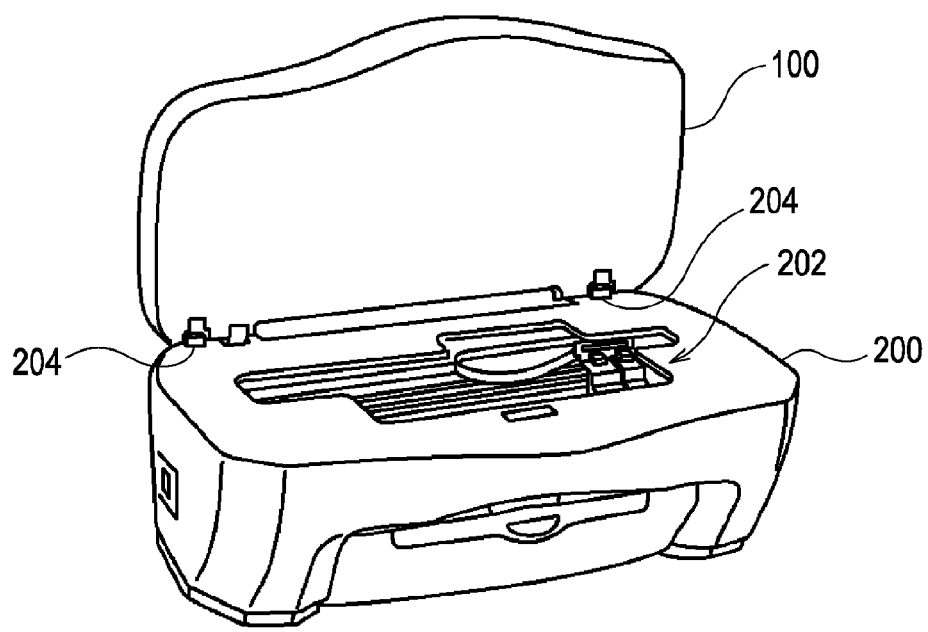
FIG. 4 is a perspective view illustrating an example of the printing apparatus according to the exemplary embodiment of the invention that is switched into printing mode from scanning mode by lifting the proximal end thereof.

All components that make up the scanning unit 100 are encased in a single scanner body chassis. As illustrated in FIG. 4, the scanning unit 100 and the printing unit 200 are jointed to each other by a series of hinge members 204 provided on the rear surface of the printing apparatus 10. With this structure, a user can lift the scanning unit 100 by lifting the proximal end of the scanning unit 100, so that the scanning unit 100 pivots on the hinge members 204.

FIG. 4 is a perspective view that schematically illustrates an example of the printing apparatus 10 of the present embodiment with the scanning unit 100 lifted so as to expose the upper surface of the printing unit 200. Within the printing unit 200, various structural components work together to perform the printing function, including a control circuit 260, a power circuit, and the like, which are described more fully below.

As shown in FIG. 4, an opening portion 202 is formed in the upper surface of the printing unit 200. The opening portion 202 provides a user with access to the internal configuration of the printing unit 200 so that the user may have easy access to the inside of the printing unit 200 so that the user may perform various maintenance tasks, such as replacing the ink cartridges and other disposable parts, troubleshooting a paper jam malfunction, making minor adjustments, and the like.

B. Internal Configuration of Apparatus

Figure 5:
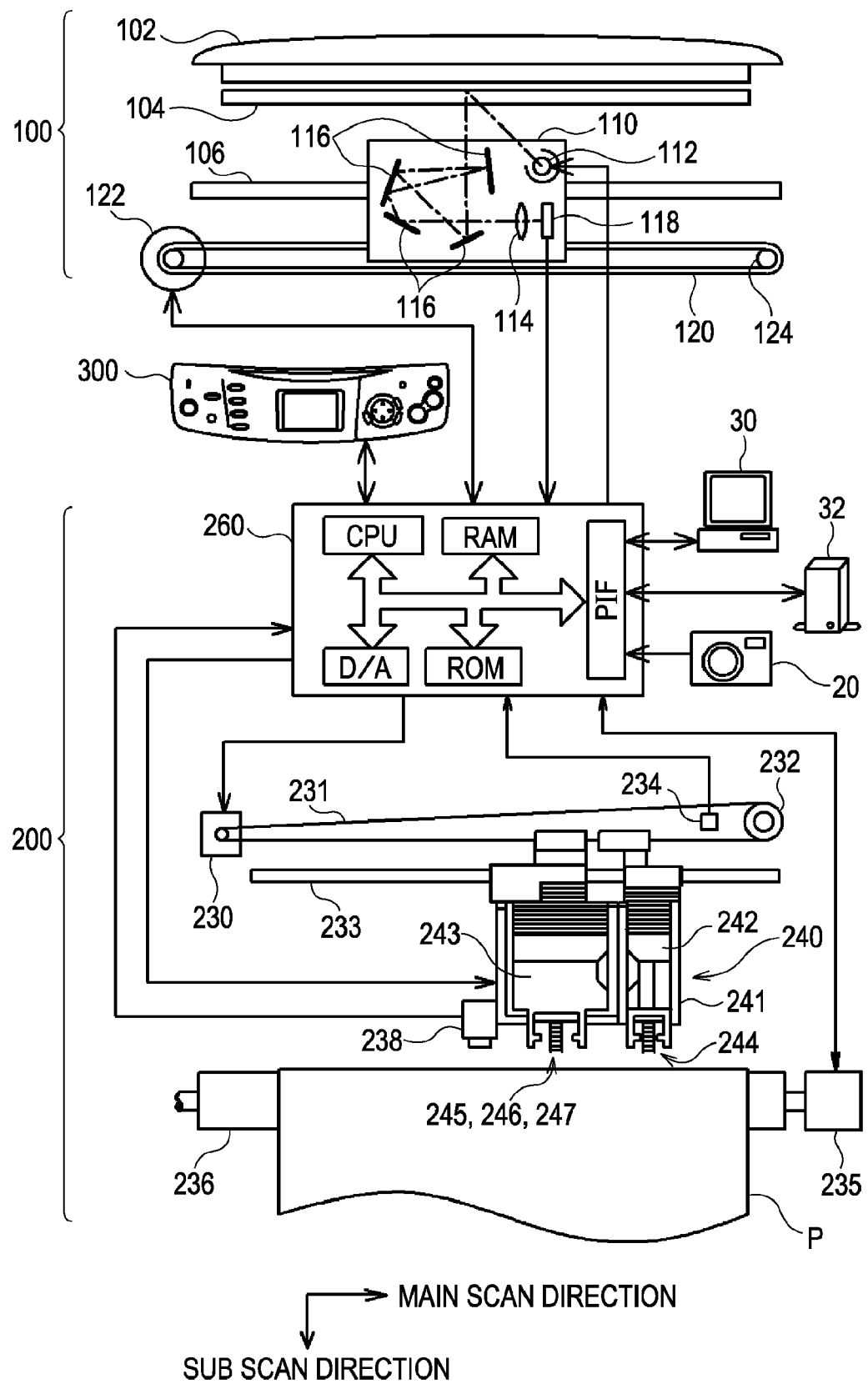
FIG. 5 illustrates the configuration of the printing apparatus according to the exemplary embodiment of the invention.

FIG. 5 is a diagram illustrating the internal configuration of the printing apparatus 10 according to the present embodiment of the invention. As previously described, the printing apparatus 10 is provided with the scanning unit 100 and the printing unit 200. Various kinds of structural components, the combination of which offers the scanning function, are provided in the scanning unit 100. On the other hand, various kinds of structural components, the combination of which offers the printing function, are provided in the printing unit 200. In the following description, the inner configuration of the scanning unit 100 is explained, which is followed by an explanation of the inner configuration of the printing unit 200.

1. Internal Configuration of the Scanning Unit

The scanning unit 100 is comprised of a transparent glass plate 104, a glass plate cover 102, a reading carriage 110, a driving belt 120, a driving motor 122, and a guide axis 106. A target image is set on the transparent glass plate 104. The glass plate cover 102 holds the target image that is placed on the transparent glass plate 104 in place. The reading carriage 110 scans the target image, while the driving belt 120 moves the reading carriage 110 in the reading or main-scan direction. The driving motor 122 supplies motive power to the driving belt 120. The guide axis 106 guides the movement of the reading carriage 110. The control circuit 260, which will be described more fully below, controls the operation of the driving motor 122 and the reading carriage 110.

As the driving motor 122 rotates under the control of the control circuit 260, the rotational force of the driving motor 122 is communicated to the reading carriage 110 via the driving belt 120. As a result, the reading carriage 110 travels in the reading direction as guided by the guide axis 106 in accordance with the rotation angle of the driving motor 122. The driving belt 120 is constantly kept in a moderately tense state due to an idler pulley 124. Accordingly, it is possible to move the reading carriage 110 in the reverse direction by a distance that is in accordance with the rotation angle of the driving motor 122 by rotating it in the reverse direction.

A light source 112, a lens 114, mirrors 116, a CCD sensor 118, and the like, are provided in the reading cartridge 110. Light emitted by the light source 112 is irradiated on the transparent glass plate 104. The irradiated light is then reflected by the target image on the transparent glass plate 104. The set of mirrors 116 further reflects the light that is reflected by the target image toward the lens 114, and converges the incoming light. Then, the CCD sensor 118 detects the light converged by the lens 114. In this example, the CCD sensor 118 comprises a linear array sensor having photodiodes that are aligned in a direction orthogonal to the moving direction of the reading carriage 110. The photodiodes convert the intensity of light into an electric signal. With this configuration, it is possible to create an electric signal that corresponds to the target image by irradiating light emitted from the light source 112 on to the target image while moving the reading carriage 110 in the main-scan direction, and then by detecting the intensity of the reflected light using the CCD sensor 118.

The light source 112 is made up of light emitting diodes that correspond to three color-components, R, G, and B. With such a configuration, the light source 112 irradiates R-color light, G-color light, and B-color light in a sequential order in a predetermined cycle. Using this configuration, the CCD sensor 118 is able to detect the R-color, G-color, and B-color reflected light in a sequential order. Generally speaking, the red portion of an image reflects R-color light, whereas it reflects almost no G-color light or B-color light. Therefore, R-color reflected light indicates the R component of an image. Similarly, G-color reflected light indicates the G component of the image, while B-color reflected light indicates the B component of the image. Therefore, if R-color light, G-color light, and B-color light are irradiated on the target image in a sequential order in a predetermined cycle. If the CCD sensor 118 detects the R-color, G-color, or B-color reflected light during the irradiation process, a corresponding R component, G component, and B component is recorded for that position.

More specifically, the position of the image at where the R, G, and B components are detected is shifted by an amount corresponding to the travel distance, or distance that the reading carriage 110 has moved during the time period when the light source 112 switches between the R-color light, G-color light, and B-color light. Typically, however, this shift is compensated for by performing corrective image process on the captured data.

2. Internal Configuration of the Printing Unit

Next, the internal configuration of the printing unit 200 will be explained. The printing unit 200 is provided with the control circuit 260 that is responsible for controlling the entire operation of the printing apparatus 10, a printing carriage 240 that is used for printing an image on a printing medium, a mechanical component that moves the printing carriage 240 in the main-scan direction, a mechanical component that feeds the printing medium, and the like.

In this configuration, the printing carriage 240 comprises a black ink cartridge 242 that retains black (K) ink, along with a color ink cartridge 243 that contains cyan (C) ink, magenta (M) ink, and yellow (Y) ink, and a print head 241 that is provided on the bottom surface of the printing carriage 240. The printing head 241 has an ink discharging head that discharges ink drops for each ink color. Upon attachment of ink cartridges 242 and 243 to the printing carriage 240, ink retained in each ink cartridge is supplied to the ink discharging head 244, 245, 246, or 247 of the corresponding color via an ink supply tube (not shown).

The mechanical structure that moves the printing carriage 240 in the main-scan direction comprises a carriage belt 231, a carriage motor 230, a tension pulley 232, a carriage guide 233, and an origin detection sensor 234. The carriage belt 231 transmits a driving force to the printing carriage 240. The carriage motor 230 supplies a motive power or driving force to the carriage belt 231. The tension pulley 232 keeps the carriage belt 231 constantly in a moderately tense state. The carriage guide 233 guides the movement of the printing carriage 240. The origin detection sensor 234 detects the home position of the printing carriage 240. As the carriage motor 230 rotates under the control of the control circuit 260 the printing carriage 240 travels in the main-scan direction by a distance that is in accordance with the rotation angle of the carriage motor 230. In addition, it is also possible to move the printing carriage 240 in the reverse direction by rotating the carriage motor 230 in the reverse direction.

The mechanical structure that feeds the printing medium, which is assumed to be a sheet of paper herein, is comprised of a platen 236 that supports the printing medium from the rear-surface side and a paper feed motor 235 that feeds the printing medium by rotating the platen 236. As the paper feed motor 235 rotates under the control of the control circuit 260, the printing medium is fed in the sub-scan direction by a distance that corresponds to the rotation angle of the paper feed motor 235.

The control circuit 260 comprises a CPU that functions as a central component, a ROM, a RAM, a D/A converter that converts digital data into an analog signal, and a peripheral equipment interface PIF that is used for data-interfacing with peripheral equipment. As previously described, the control circuit 260 controls the entire operation of the printing apparatus 10. While performing data exchange with the light source 112, the driving motor 122, and the CCD sensor 118, all of which are mounted in the scanning unit 100, are controlled by the control circuit 260.

In addition, the control circuit 260 also controls the ink-drop discharging process, wherein driving signals are supplied to the ink discharging heads 244, 245, 246, and 247 which correspond to the respective ink colors while the carriage motor 230 and the paper feed motor 235 are driven by the control circuit 260 so as to move the printing carriage 240 in the main-scan direction and the sub-scan direction, respectively. The driving signals that are supplied to the ink discharging heads 244, 245, 246, and 247 are generated by reading image data from a computer 30, a digital camera 20, an external storage unit 32, or the like, and then by performing image processes described more fully below.

In addition, it is possible to generate the driving signals by performing an image process on the image data that is read by the scanning unit 100. Under the control of the control circuit 260, the ink discharging heads 244, 245, 246, and 247 discharge ink drops so as to form ink dots of respective ink colors on a printing medium while the printing carriage 240 operates in the main-scan direction and the sub-scan direction. By this means, the printing apparatus 10 is able to print a color image.

In addition to the configuration wherein image process is carried out inside the control circuit 260, it is possible to adopt an alternative configuration wherein data that has already been subjected to image process is received from the computer 20. In such a configuration, the control circuit 260 drives the ink discharging heads 244, 245, 246, and 247 in accordance with the data received from the computer 20, while operating the printing carriage 240 in the main-scan direction and the sub-scan direction.

The control circuit 260 is further connected to the operation panel 300 so that it can exchange data therewith. By manipulating a variety of operation buttons provided on the operation panel 300, a user is able to make the detailed and/or specific settings of various kinds of scanning operation modes and/or printing operation modes. In addition, it is also possible for the user to make the detailed/specific operational mode settings by accessing from the computer 20 thereto via the peripheral equipment interface PIF.

Figure 6:
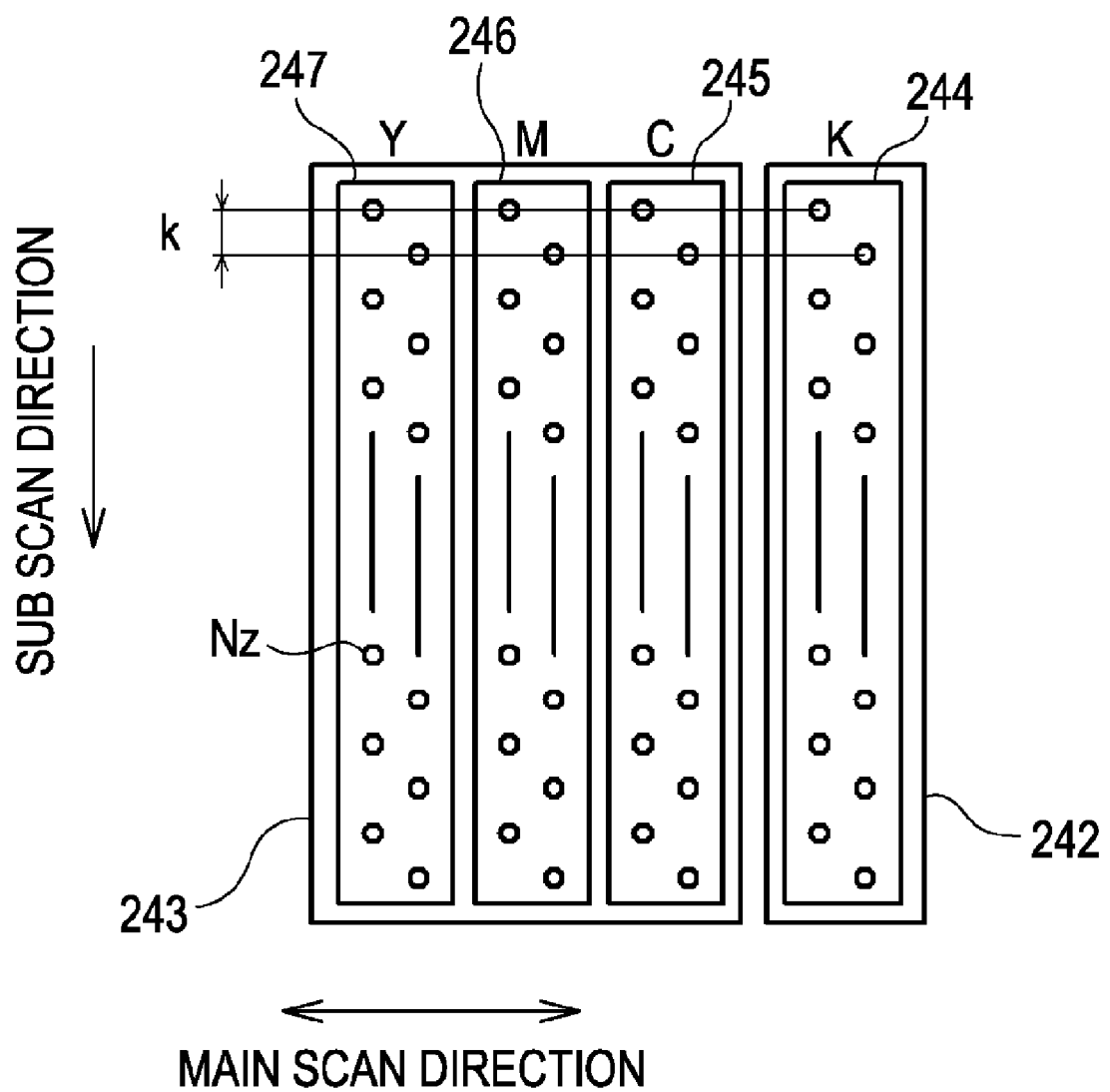
FIG. 6 is a schematic diagram illustrating an example of a plurality of ink discharging heads each of which includes a plurality of nozzles that are capable of discharging ink drops.

FIG. 6 is a schematic diagram that illustrates an example of the ink discharging heads 244, 245, 246, and 247 of respective ink colors, each of which has a plurality of nozzles Nz that discharge ink drops. As illustrated in the drawing, four sets of nozzle lines that discharge ink are formed on the bottom surfaces of the ink discharging heads 244, 245, 246, and 247 which correspond to the respective ink colors. Each one of these four sets of nozzle lines has forty-eight nozzles Nz that are arrayed in a staggered pattern at intervals of a nozzle pitch "k". A driving signal is supplied from the control circuit 260 to each of the nozzles Nz. In accordance with the supplied driving signal, each of the nozzles Nz is configured to discharge ink drops of the corresponding ink color.

As explained above, the printing unit 200 of the printing apparatus 10 prints an image by supplying a driving signal to each of the ink discharging nozzles, which causes the ink discharging nozzles to discharge ink drops onto a printing medium so as to form ink dots thereon in accordance with the supplied driving signals. Before the printing of an image is executed, control data for driving the ink discharging nozzles is generated by performing a predetermined image process on image data.

III. Image Print Process

Figure 7:
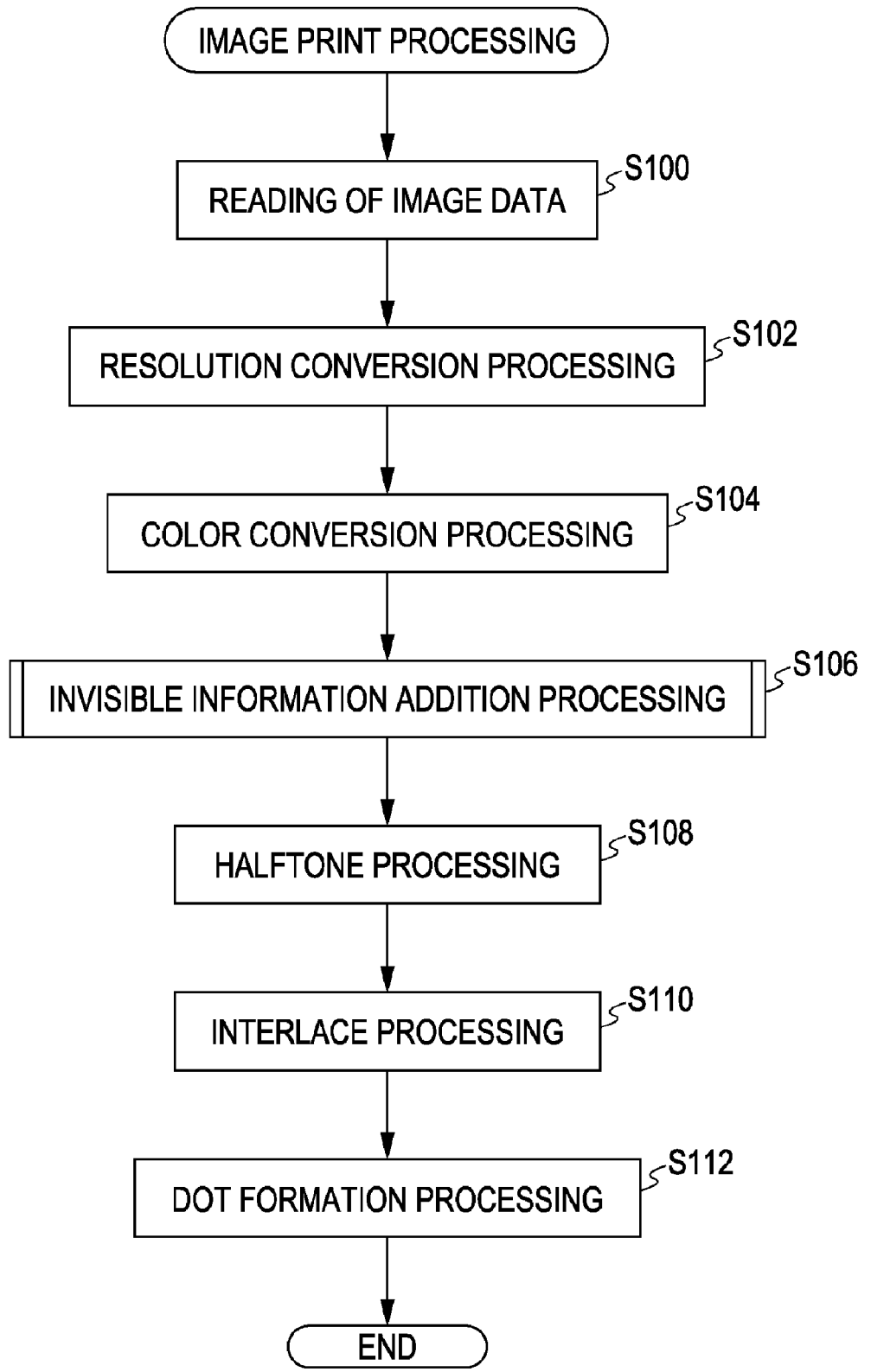
FIG. 7 is a flowchart illustrating a printing process which may be performed by a printer driver.

FIG. 7 is a flowchart that illustrates a method of performing the image print process that is performed by a printer driver. The image print process is implemented by the control circuit 260 through the operations of the CPU, RAM, ROM, and the like comprise the internal functional elements of the control circuit 260.

As illustrated in FIG. 7, during the first step of the image print process, image data is read S100 or loaded. In this example, it is assumed that the image data is represented by each gradation value of R component, G component, and B component (i.e., RGB image data).

Next, a print resolution conversion process is performed S102. During the print resolution conversion process, the resolution of the read image data is converted into a print resolution that the printing unit 200 is capable of printing. If the resolution of the read image data is lower than the print resolution, a computation is performed so as to interpolate new pixel(s) between existing adjacent pixels, thereby creating new image data. In this way, the resolution of the read image data is converted into a higher resolution. On the other hand, if the resolution of the read image data is higher than the print resolution, a computation is performed so as to skip a predetermined amount image data from existing pixels. In this way, the resolution of the read image data is converted into a lower resolution. That is, during the print resolution conversion process, interpolation or "pixel-skipping" is performed on the read image data at an appropriate rate so as to convert the resolution of the read image data to the print resolution.

Next, the control circuit 260 of the printing apparatus 10 performs a color conversion process S104 on the image data. In this configuration, the color conversion process comprises the conversion of image data that is represented by three primary color components of R, G, and B into another image data that is represented by the gradation values of ink color components of C, M, Y, and K. The color conversion process is carried out by referencing a three-dimensional mathematical table referred to as a color conversion table (LUT), such as the example show in FIG. 8.

Figure 8:
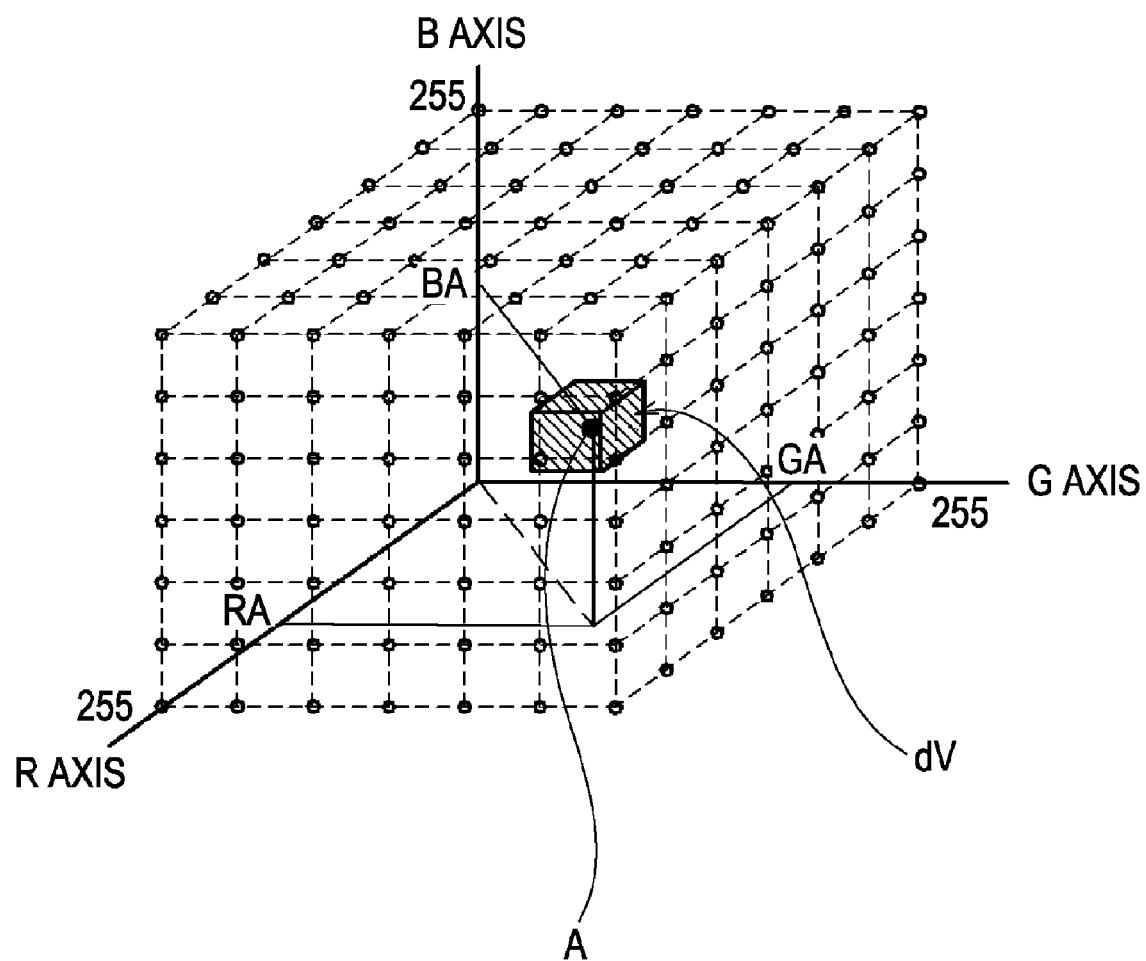
FIG. 8 illustrates an example of a color conversion table that is used when color conversion process is performed.

Within the color conversion table, it is assumed that the gradation value of each of the R component, G component, and B component may vary in value within a range from 0 to 255. Herein, as illustrated in FIG. 8, the color space is represented by three axes, that is, R axis, G axis, and B axis, which are orthogonal to one another. The gradation value of each of the R component, G component, and B component is shown on the corresponding axis. Using this method, each conceivable RGB image data can be described as a unique inner point that is encased inside a cube (i.e., color solid) that is located up to two hundred and fifty-five (255) units from on each axis with its origin at the vertex of the three axis.

On the contrary, the color solid may be diced in such a manner that each plane defined by two perpendicular axes that is parallel to a face of the cube defined by the corresponding two of the R axis, G axis, and B axis is represented as a grid pattern. Under such an assumption, one can regard that each one of all grid points inside this color space denotes a certain piece of the RGB image data. Therefore, if a combination of the gradation values of C, M, Y, and K is stored in advance in association with each one of these grid points, any RGB image data may be converted into another image data that is represented by the gradation values of respective colors (i.e., CMYK image data) by reading out the gradation values that are pre-stored in association with the specific grid point.

For example, as illustrated in FIG. 8, if it is assumed that the R component of a certain piece of image data is denoted as RA, whereas the G and B components thereof are respectively denoted as GA and BA, this image data is associated with the three-dimensional point A in the color space. In order to utilize such an association, the die dV that contains the point A is detected among all the dies that make up the color. Then, the gradation values of respective colors of C, M, Y, and K that are pre-stored in association with each of the grid points of the die dV are read out. By this means, it is possible to calculate the gradation values at the point A by performing an interpolative computation on the basis of the gradation values of each of the grid points. As explained above, the color conversion table LUT may be regarded as a three-dimensional mathematical table that stores a combination of the gradation values of respective colors of C, M, Y, and K (i.e., CMYK image data) in association with each of the grid points that is denoted as a combination of the gradation values of respective colors of R, G, and B. By looking up such a color conversion table LUT, it is possible to convert any RGB image data into corresponding CMYK image data quickly and easily.

Returning again to FIG. 7, after converting RGB image data into CMYK image data, the invisible information is embedded S106 into the image data. Although various kinds of techniques are known for embedding invisible information into an image, all of known techniques require dedicated equipment and/or a dedicated printing apparatus. In addition, it further requires an image process apparatus having a powerful process capability. In contrast, the present embodiment of the invention offers a simpler approach for embedding invisible information into an image using an ordinary ubiquitous printing apparatus, using a method described more fully below.

After completing the invisible information addition process, the control circuit 260 starts a halftone process S108 that is performed on the image data in which invisible information is embedded. The halftone process is described more fully below. The CMYK image data that is obtained after the color conversion process is represented by a gradation value within a range from zero to two hundred fifty-five (0-255) for each color of C, M, Y, and K. On the other hand, the printing unit 200 prints an image by performing dot formation. Therefore, in order to perform printing, it is necessary to convert the CMYK image data, including each color component of which is represented in one of two hundred fifty-six (256) gradations, into set of another image data that is represented in terms of the presence or absence of a dot formed at each pixel, referred to as dot data. That is, the halftone process S108 is the conversion of the CMYK image data into dot data for each color component.

Various methods, including error diffusion or a dithering may be adopted for performing the halftone process. In the error diffusion method, the presence or absence of a dot is determined such that any possible error in half toning that could occur on a certain pixel is diffused to its peripheral pixels, and at the same time, any possible error that is diffused from its peripheral pixels to the above-mentioned certain pixel is corrected. In the dither method, thresholds that are set randomly in a dither matrix are compared with the corresponding values of image data for each color component of C, M, Y, and K on a pixel-by-pixel basis. If the value of the image data is larger than the threshold for a certain pixel, it is judged that a dot should be formed for this pixel. On the other hand, if the value of the image data is less than the threshold for another certain pixel, it is judged that a dot should not be formed for this pixel. In this way, dot data for each pixel is obtained. Although any number of methods may be used, in the following description it is assumed that the dither method is employed as a method for performing the halftone process.

FIG. 9 illustrates a part of the dither matrix in an enlarged view. The matrix has vertical sixty-four (64) pixels and horizontal sixty-four (64) pixels, for a total of four thousand and ninety-six (4,096) pixels, randomly stored thresholds that are selected within a range from 0 to 255 of gradation values in a uniformly distributed manner. Herein, the reason why the gradation values of these thresholds are selected within the range from 0 to 255 is that the image data for each color component of C, M, Y, and K according to the present embodiment of the invention is one byte data, and thus, the gradation values fall within the range from 0 to 255. It should be noted that the size of the dither matrix is not limited to the exemplary matrix configuration illustrated in FIG. 9, which has vertical 64 pixels and horizontal 64 pixels. That is, various sizes of the dither matrix may be adopted. It should be particularly noted that the number of vertical pixels in the matrix does not necessarily have to be equal to the number of horizontal pixels.

Figure 10:
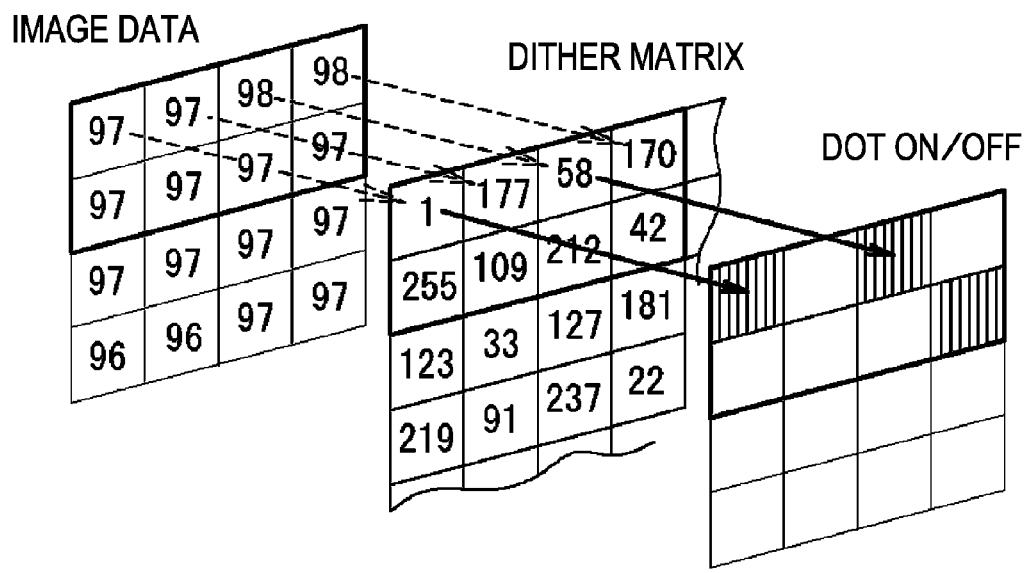
FIG. 10 illustrates examples of determinations that may be made as to whether a dot should be formed or not for each pixel using the dither matrix.

FIG. 10 is an explanatory which illustrates an example of a series of judgments that are made as to whether or not a dot should be formed for each pixel using the dither matrix as a reference. Although these judgments are made for each of four color components of C, M, Y, and K, in order to simplify explanation, image data of these color components of C, M, Y, and K is simply referred to as image data in the following description without making any particular differentiation for image data of one color component of C, M, Y, or K from that of other color components thereof.

When making a determination as to whether or not a dot should be formed for a certain pixel, the gradation value of image data for the pixel that is the currently focused target of judgment (hereafter referred to as "judgment target pixel") is compared with a threshold value that is stored at a corresponding cell in the dither matrix. Each of four arrows that are shown in thin broken lines in the drawing schematically illustrates that the gradation value of the image data of the judgment target pixel is compared with the threshold value that is stored at the cell corresponding to the judgment target pixel in the dither matrix. During the comparison, if it is found that the gradation value of the image data of the judgment target pixel is larger than the threshold value that is stored at the corresponding cell in the dither matrix, it is determined that a dot should be formed for this judgment target pixel. On the other hand, as a result of comparison, if it is found that the gradation value of the image data of the judgment target pixel is smaller than the threshold value that is stored at the corresponding cell in the dither matrix, it is judged that a dot should not be formed for this judgment target pixel. With reference to an example illustrated in FIG. 10, the gradation value of the image data of the pixel at the upper left corner is "97", whereas the threshold value that is stored at the cell corresponding to the upper-left-corner judgment target pixel in the dither matrix is "1". Therefore, it is judged that a dot should be formed for this upper-left-corner pixel because the gradation value of the image data of this judgment target pixel is larger than the threshold value that is stored at the corresponding cell in the dither matrix. Each of two arrows that are shown in thick solid lines in the drawing schematically conceptualizes that it is judged that a dot should be formed for the pixel indicated thereby and that the result of judgment is written into a memory.

With reference to the adjacent pixel that lies immediately on the right of the upper-left-corner pixel, the gradation value of the image data of this pixel is "97", whereas the threshold value that is stored at the cell corresponding to this pixel in the dither matrix is "177". Therefore, it is judged that a dot should not be formed for this pixel because the gradation value of the image data of this pixel is smaller than the threshold value that is stored at the corresponding cell in the dither matrix. Thus, it is possible to decide whether a dot should be formed or not on a pixel-by-pixel basis by comparing the gradation value of the image data of each judgment target pixel and the threshold value that is stored at the corresponding cell in the dither matrix. In the halftone process S108 shown in FIG. 7, the dither method is applied to image data of each of color components of C, M, Y, and K so as to generate dot data based on the presence (ON, a dot should be formed) or absence (OFF, a dot should not be formed) of a dot to be formed for each pixel.

As shown in FIG. 7, during the image print process, an interlace process S110 is started after the halftone process wherein the generated dot data is rearranged in accordance with the order of dot formation performed by the print head 241 so as to supply the rearranged data to the ink discharging heads 244, 245, 246, and 247 of respective ink colors. As shown in FIG. 6, the nozzles Nz are arrayed at intervals of the nozzle pitch "k" along the sub-scan direction in each of the ink discharging heads 244, 245, 246, and 247. For this reason, unless any technical measures are taken for discharging ink drops while moving the printing carriage 240 in the main-scan direction, dots will be formed with undesirable intervals of the nozzle pitch "k" along the sub-scan direction. In order to form dots on all of dot-ON pixels, it is necessary to move the relative positions of the printing carriage 240 and a printing medium in the sub-scan direction for the purpose of forming intermediate dots between each two adjacent dots that are distanced from each other by the nozzle pitch "k". As described above, when an image is printed, dot formation is not performed simply in a sequential order, meaning that not all of the upper pixels of the image are processed for dot formation before the lower pixels thereof. In addition, it is popular in the related art to form sporadic and discontinuous dots at intervals in each execution of main-scan operations in order to satisfy image quality requirements. That is, instead of forming all dots for a single line of pixels that are aligned in the main-scan direction during a single main-scanning operation, the main-scanning operation is divided into a number of executions for a single line of pixels so as to enhance image quality.

Therefore, prior to starting the actual dot formation process, it is necessary to rearrange the generated dot data for respective colors of C, M, Y, and K in accordance with the order of dot formation performed by the ink discharging heads 244, 245, 246, and 247 for the respective ink colors. This order-rearrangement process is referred to as the "interlace" process S110.

As illustrated in FIG. 7, after completion of the interlace process S110, the dot formation process S112 is started on the printing medium in accordance with the dot data rearranged in the interlace process S110. During the dot formation process, the rearranged dot data is supplied to the ink discharging heads 244, 245, 246, and 247 of the respective ink colors while the printing carriage 240 is moved in the main-scanning direction by driving the carriage motor 230. Consequently, each of the ink discharging heads 244, 245, 246, and 247 discharges ink drops in accordance with the supplied dot data so as to form dots for respective pixels.

After completion of one execution of the main-scanning operation, the paper feed motor 235 is driven to feed the printing medium in the sub-scanning direction. Thereafter, the rearranged dot data is supplied to the ink discharging heads 244, 245, 246, and 247 of the respective ink colors while the printing carriage 240 is moved in the main-scanning direction by driving the carriage motor 230 so as to form dots for respective pixels. These operations are performed in a repetitive manner in order to form dots of respective colors of C, M, Y, and K on the printing medium in a proper distribution in accordance with the gradation values of the image data. As the result, an image is printed.

As explained above, during the image print process, a predetermined series of processes are performed on the received image data. Then, in accordance with the obtained dot data, ink dots are formed on the printing medium. By this means, a print image is outputted. As mentioned earlier, invisible information is added to the image data in the invisible information addition process of the image print process. Consequently, the printed image has invisible information embedded therein.

IV. Invisible Information Addition Process

Figure 11:
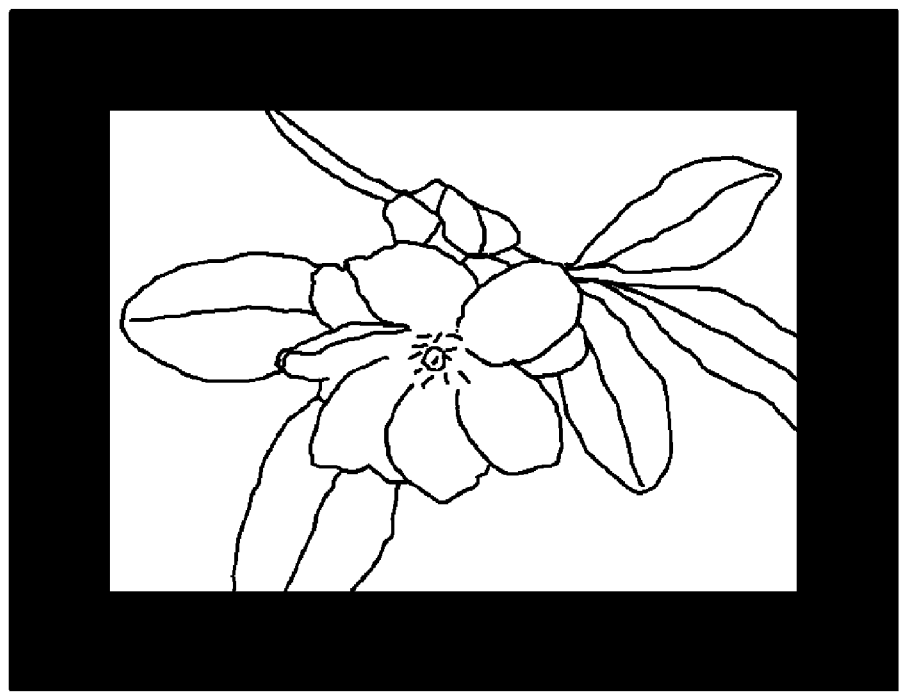
FIG. 11 illustrates an example of an object image into which invisible information may be embedded.

Before describing the invisible information addition process, a few basic principles of embedding invisible information into an image will be briefly explained. FIG. 11 is an explanatory diagram that schematically illustrates an example of an object image into which invisible information may be embedded. As illustrated in the drawing, the peripheral portion of the object image of FIG. 11 is painted in black, forming a frame. Normally, such a black-paint portion is printed by means of K ink only. However, it is also possible to represent black by combining C ink, M ink, and Y ink in amounts that are substantially equal to one another. The mixed black represented by C ink, M ink, and Y ink is sometimes called as "composite black. On the other hand, the non-mixed black represented by means of K ink only is sometimes called as "real black". Since both of a portion processed by means of composite black and another portion processed by means of real black are printed in "black", at first glance there seems to be no difference between the two versions. However, upon closer observation, it is possible to perceive a subtle difference between the colors in terms of surface gloss, degree of surface roughness, black tone, etc. Moreover, the subtle difference may be recognized based on a difference in blackness that is perceived under different light source conditions. The invisible information addition process according to the present embodiment of the invention is based on the principle that embedded "invisible" information can be recognized by taking advantage of these subtle differences that are hard to perceive at first glance but could be recognized with the naked eye upon closer observation.

With reference to FIG. 11, a more detailed explanation will be described. The frame-like portion painted in black is printed, usually, by means of K ink only, that is, in real black. If a user has any information that s/he wishes to embed into an object image in an invisible state, such information is printed as embedded characters and/or image(s) that are printed in composite black in the background, or other area of the image that is printed in real black. By this means, since both of the portion or area printed in real black and the portion or area printed in composite black constitute a black part of the printed image, the embedded characters and/or image(s) are not readily perceivable at first glance. However, if one makes a careful observation of the portion or area printed in composite black, it is possible for him/her to recognize the information embedded therein in an invisible state.

Needless to say, in the strict sense, it is not literally correct to call the embedded information as "invisible" because one can recognize the presence thereof with the unaided eye upon careful observation. However, in the practical sense, one cannot readily perceive the presence of the invisible information embedded in the frame-like area painted in black in the example illustrated in FIG. 11. Even if one knows that there is some information embedded therein, it is usually hard for him or her to identify where it is embedded when he or she does not know the specific position at which the invisible information is embedded. Thus, it is almost impossible for a person to recognize the embedded information without knowing specifically what they are looking for. Therefore, actually speaking, it can be said that the information is embedded in an invisible state. In order to embed such invisible information into an object image, the present invention substitutes the CMYK image data that is represented in composite black (i.e., image data that is made up of a mixture of the C component, M component, and Y component, the value of one of which is almost equal to those of other two) for the CMYK image data that is represented in real black (i.e., image data that is constituted by the K component only).

In the example explained above, composite black is used as a substitute for real black in order to embed the invisible information into the object image. However, the invention is not limited to such a specific example described herein. That is, the invention can be applied to any combination of different printing conditions that has similar relationships as those between real black and composite black. Thus, the example described above is a mere example, meaning that any combination thereof that allows an observer to perceive a subtle difference(s) between the colors with the unaided eye on the based on surface gloss, degree of surface roughness, black tone, and the like, upon closer observation thereof. For example, real black may be over-coated with composite black. As another example of modification, transparent ink may be painted over real black. As still another example of various modified configurations, if the printing apparatus is equipped with two types of ink that are different from each other in terms of their shades of ink color, for example, C ink and LC ink, it is possible to embed invisible information into an object image by substituting a deep ink for a light ink that represents the same shade of color, or vice versa.

In order to further support and amplify the basic understanding of the invention, which will be obtained from the above explanation, more detailed explanation of the invisible information addition process performed by the printing apparatus 10 according to the present embodiment of the invention is given below. Although various kinds of difference recognition approaches or methods may be adopted as described above, in order to simplify explanation, it is assumed in the following description that the real-black portion or area of the printed image that is represented by means of the K ink has a greater degree of surface gloss in comparison with the composite-black portion or area thereof that is represented by means of the mixture of the C ink, M ink, and Y ink. That is, in the example discussed below, the difference in the surface gloss between the two types of black that are used as the difference recognition factor so as to perceive the embedded invisible information.

FIG. 12 is a flowchart that illustrates the process of adding the invisible information according to the present embodiment of the invention. The invisible information addition process is performed on the image data (CMYK image data)

that is subjected to the color conversion process illustrated in FIG. 7. In the invisible information addition process, the stored data of the invisible information is loaded or read S200.

FIG. 13 is a set of explanatory diagrams illustrating examples of the invisible information data. FIG. 13A illustrates a character "EPS" as an example of the invisible information that may be embedded into the object image. As may be understood by one of ordinary skill in the art, the invisible information data is not limited to any character(s). As illustrated in FIG. 13B, it may be a logo, or as illustrated in FIG. 13C, it may be date and/or time information such as the shooting date and time of the object image, or the like. As still another example of the invisible information data, it may be a dot pattern such as the example illustrated in FIG. 13D. In any case, the invisible information data may be stored in advance in the ROM of the control circuit 260 of the printing apparatus 10, or it may be read out of the computer 30, the external storage unit 32, or the like as a user manipulates the operation panel 300 (shown in FIG. 5) when he or initiates the printing process.

Returning to FIG. 12, after the invisible information data is read S200, the position on the object image at which the invisible information is going to be embedded is determined S202. The position of where the invisible information is going to be embedded in the object image may be predetermined. Or a user may set this position by manipulating the operation panel 300 or the computer 30. As mentioned earlier, since the printing apparatus 10 according to the present embodiment of the invention performs the embedding of invisible information by using a real black ink, which offers a greater surface gloss in comparison with that of composite black, it is possible to embed the invisible information in the frame-like area of the object image that is painted in black, such as in the example show in FIG. 14.

Examples of various modifications that may be used in association with the invention include scaling the size of the invisible information up or down in order to adjust the size it in accordance with the size of the frame or area of the object image where the invisible information can be embedded. After determining the position at which the invisible information is going to be embedded S202, a determination is made as to which part of the object image should be given the greater surface gloss than the remaining part. In other words, some part of the invisible information that offers a relatively great surface gloss (hereafter referred to as "glossy area") and other part thereof (hereafter referred to as "non-glossy area") are determined S204.

Figure 14:
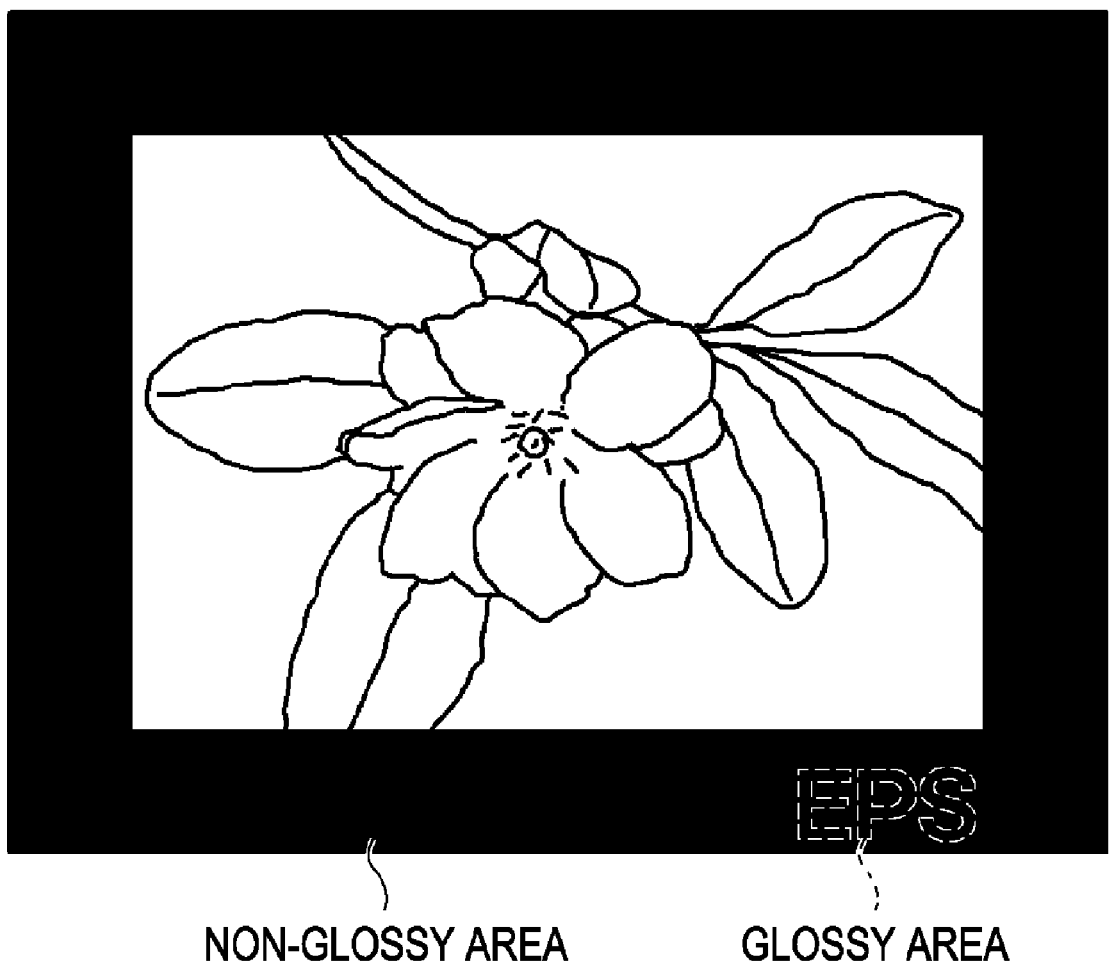
FIG. 14 illustrates an example of the object image and the invisible information after determining the target position where the invisible information may be embedded.

FIG. 14 is an explanatory diagram that illustrates an example of the object image and the invisible information after determination of the invisible information embedment target position and determination of the glossy area and the non-glossy area. As illustrated in the drawing, the character EPS, which is the invisible information, is going to be embedded at the lower right region of the black flame portion of the object image and has been determined as the glossy area. On the other hand, the frame portion of the object image that is not the character EPS portion is designated as the non-glossy area. After determining of the glossy area and the non-glossy area S204, using the ink correspondence information as a reference, the CMYK values of the pixels for the glossy area and the non-glossy area are converted S206.

Figure 15:
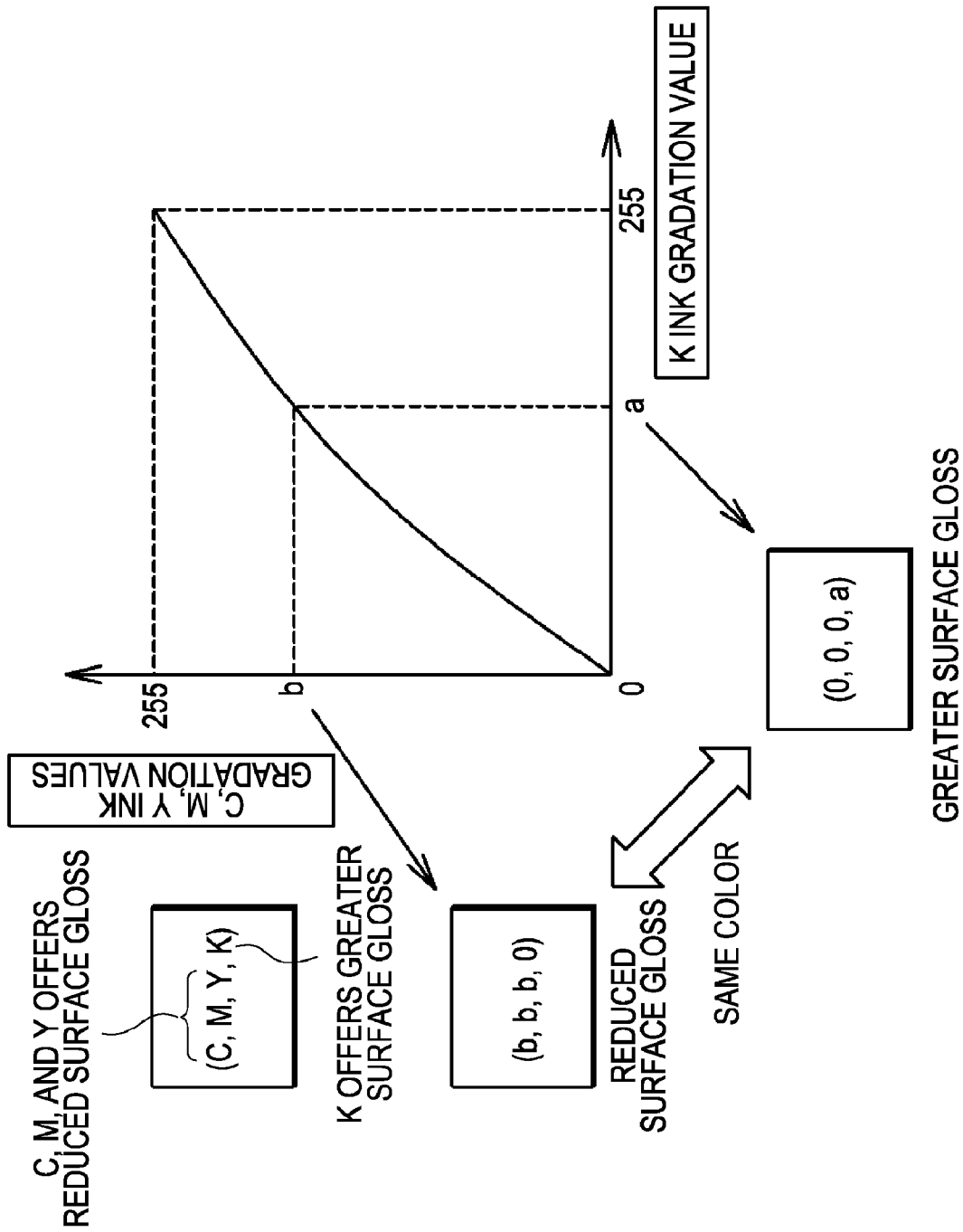
FIG. 15 illustrates an example of ink correspondence information.

FIG. 15 is an explanatory diagram illustrating an example of the ink correspondence information. As illustrated in the drawing, the ink correspondence information is pre-stored information that shows the corresponding relationship between the CMYK values of an achromatic-color image that correspond real black and the CMYK values of an achromatic-color image that correspond to a composite black. For example, as illustrated in FIG. 15, an exemplary monotone color (i.e., gray) that is represented by the CMYK values (0, 0, 0, a) of real black can be represented by the corresponding CMYK values (b, b, b, 0) of composite black. Although these two sets of the CMYK values indicate the same monotone color, as previously described, it is assumed that the printing apparatus 10 of the present embodiment of the invention performs printing in such a manner that the area of the image that is printed in accordance with the CMYK values (0, 0, 0, a) in real black has greater surface gloss than the area of the image that is printed in accordance with the CMYK values (b, b, b, 0) in composite black. As explained above, the ink correspondence information associates each set of the CMYK values in real black with the corresponding set of the CMYK values in composite black where the two sets differ in surface gloss although they indicate the same color or tone. Therefore, it is possible to convert a certain set of the CMYK values of the real black with the greater surface gloss into a corresponding set of CMYK values of composite black that have lesser surface gloss without changing the color of the resulting image.

Figure 16:
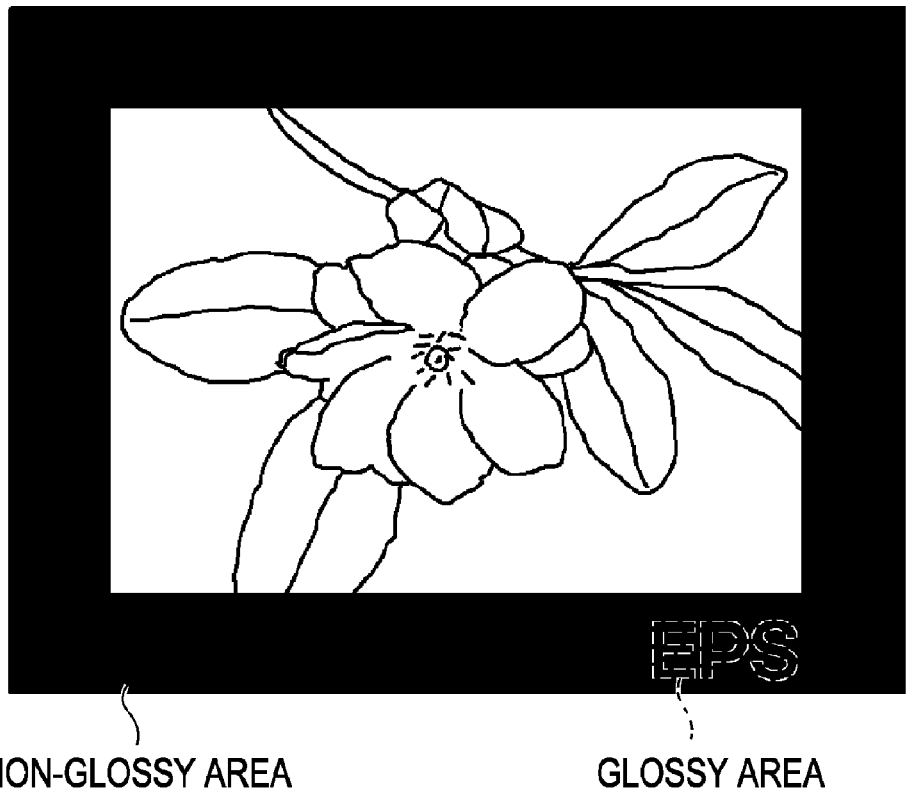
FIG. 16 illustrates the conversion of pixel data of the non-glossy area into composite-black data.

FIG. 16 illustrates the conversion of pixel data of the image data in the non-glossy area into the composite-black data in order to create the lesser surface gloss. Although both of the glossy area and the non-glossy area are black, in a typical setting of the CMYK image data the portion of the pixel data that is painted in black is defined by the real-black CMYK values of (0, 0, 0, 255). Accordingly, the pixels of the non-glossy area are converted from the real-black CMYK values of (0, 0, 0, 255) into the corresponding composite-black CMYK values of (255, 255, 255, 0) using the ink correspondence information, shown in FIG. 15 as a reference, in order to reduce the surface gloss. On the other hand, the pixels in the remaining glossy area maintain their default CMYK values (0, 0, 0, 255) and are given the higher gloss. As explained above, the pixels of the non-glossy area are subjected to conversion into the composite-black CMYK values that offer reduced surface gloss, whereas the default real-black CMYK values that offer greater surface gloss are not converted. By this means, it is possible to embed invisible information in an image, the embedded information being perceivable based on a difference in the surface gloss between the embedded image and the surrounding image.

After completing the embedding of the invisible information into the object image S206, the invisible information addition process illustrated in detail in FIG. 12 is ended. Thereafter, the process returns to the next step of the print image process illustrated in FIG. 7. Thus, a halftone process is performed S108 on the image data in which the invisible information is embedded, followed by an interlace process S110. Then, ink dots are formed S112 on a printing medium on the basis of the obtained control data. In this way, a printed image is outputted with the invisible information.

Figure 17A:
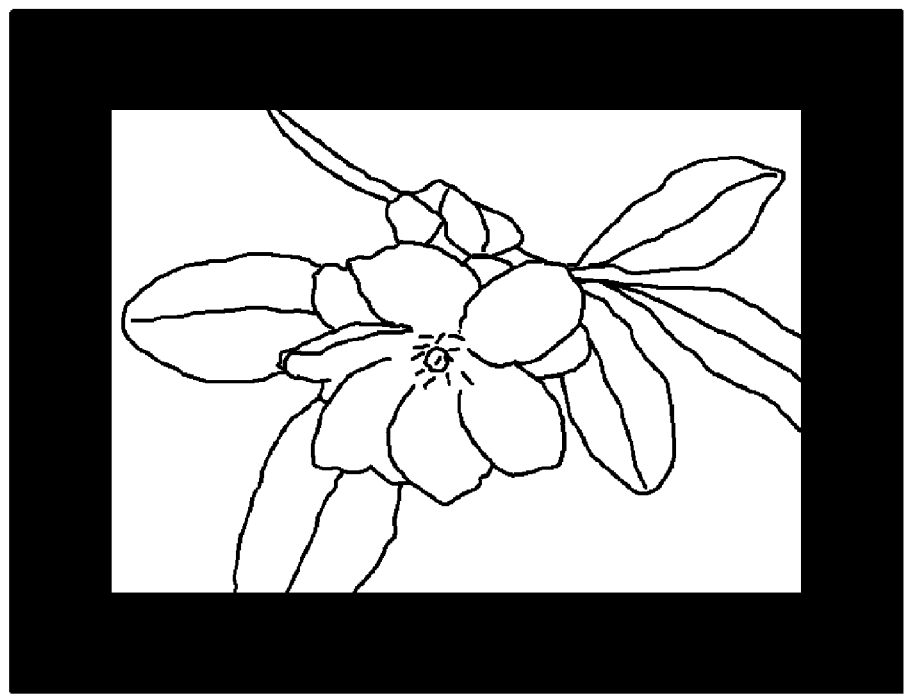
FIGS. 17A and 17B are a set of explanatory diagrams which schematically illustrate an example of a printed image which may be printed by the printing apparatus according to an exemplary embodiment of the invention.
Figure 17B:
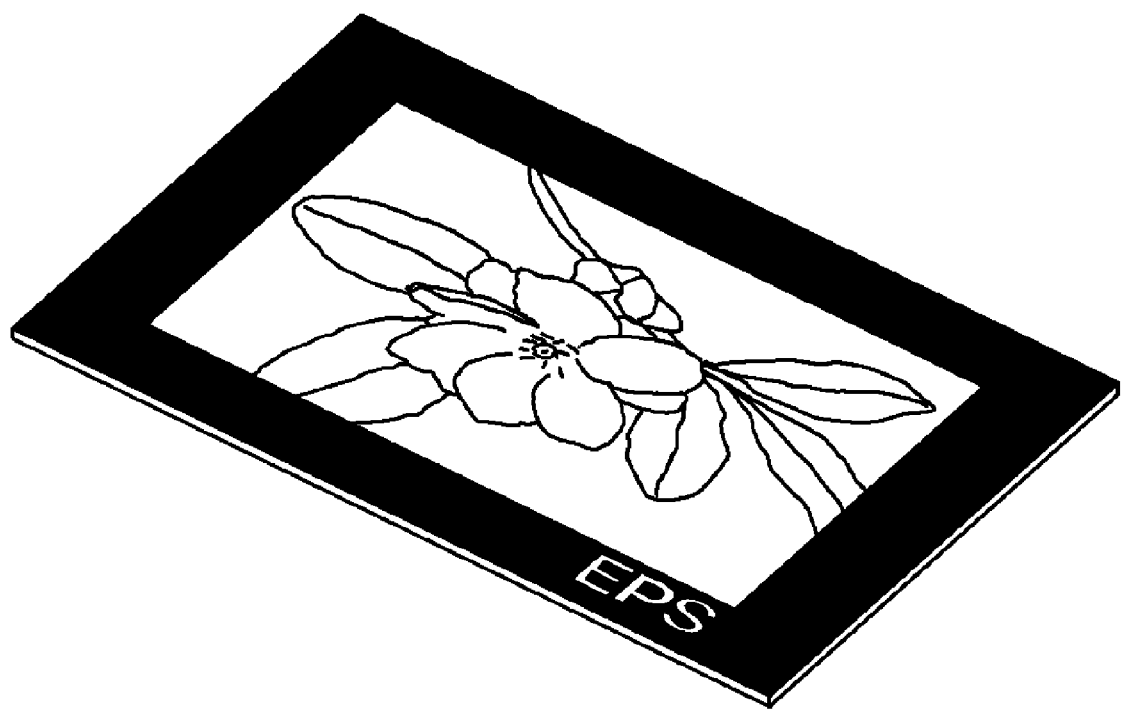

FIG. 17 is a set of explanatory diagrams illustrating an example of a printed image obtained by carrying out the image printing process described above. Invisible information is embedded in the frame-like portion of the image painted in black in FIG. 17 during the invisible information addition process, wherein real black is used for one part and composite black is used for the remaining part. At first glance, as shown in FIG. 17A, it is not possible to perceive the embedded invisible information because both the portion printed in real black and the portion printed in composite black are painted in black. However, as illustrated in FIG. 17B, upon closer observation of the printed image as viewed from an oblique angle, it is possible for one to recognize the embedded invisible information with the naked eye because the portion printed in real black has different surface gloss from that of the portion printed in composite black. Thus, as explained above, the printing apparatus of the present invention makes it possible to print an image in which invisible information is embedded such that, although the embedded invisible information is not readily perceivable at first glance, a user can recognize the embedded invisible information upon more careful observation.

Advantageously, because the K ink that typically used as real black and C ink, M ink, and Y ink used in combination for the composite black are ordinarily used in image printing, the printing apparatus according to the present embodiment of the invention does require any special ink for embedding invisible information. In addition, since invisible information is embedded using a different ink dot combination, it is not necessary to use any special paper such as the thermo-sensitive paper required by the previous art or the like for the printing. Thus, as described above, the printing apparatus of the present invention makes it possible to easily embed invisible information into an object image using readily-available ink and printing paper.

In the exemplary embodiment of the invention described above, real black and composite black are used for printing the image and embedded image. However, the invention is not limited to such an exemplary configuration. For example, as in a case where a light cyan image is printed by means of C ink and LC ink, various kinds of modified printing conditions other than a combination of real black and composite black may be adopted, so long as the resulting two printing conditions have a subtle difference from each other in terms of surface gloss, color, or the like, such that it is hard to differentiate one from the other at first glance. Thus, even when such modified printing conditions are adopted, the invention makes it possible to print an image in which invisible information is embedded in a user-friendly manner without requiring any special ink and/or printing medium.

As show in FIG. 17B, when a user attempts to visually recognize the invisible information embedded in a printed image that is outputted by the printing apparatus of the present invention, it is possible for him or her to easily perceive the embedded invisible information with the unaided eye by making a closer examination of the surface gloss, color, or the like of the printed image. As explained above, the printing apparatus according to the present embodiment of the invention makes it possible to print an image in which invisible information is easily embedded. Moreover, the printing apparatus of the present invention makes it possible to view the embedded information without requiring any special apparatus, resulting in a user-friendly approach for embedding invisible information in images.

V. Variation Example 1

In the exemplary embodiment of the invention described above, as illustrated in the flowchart of FIG. 7, the invisible information addition process S106 is performed on the CMYK image data that is obtained as the result of the color conversion process S104 in order to obtain image data in which invisible information is embedded. In a modified embodiment of the invention, it is also possible to obtain image data in which invisible information is embedded by predetermining the position where the invisible information will be embedded prior to the color conversion process, and by subsequently performing the color conversion process in accordance with the position of the invisible information. In the following description, a variation example of the image print process which uses such a modified approach is explained below.

Figure 18:
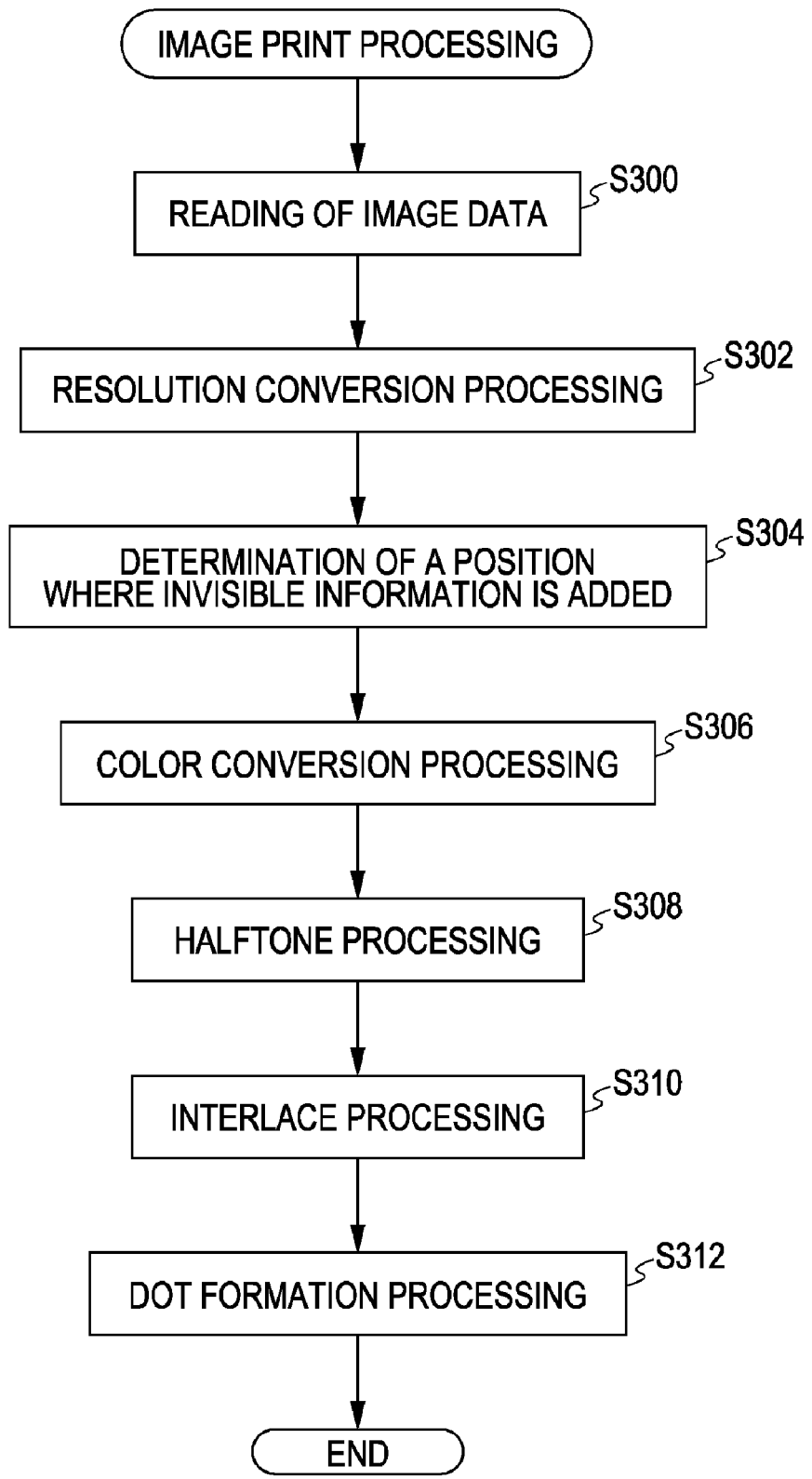
FIG. 18 is a flowchart which illustrates the image printing process according to a variation of the exemplary embodiment of the invention.

FIG. 18 is a flowchart that illustrates the process flow of the image print process according to a variation example of the exemplary embodiment of the invention. In the exemplary embodiment of the invention described with reference to FIG. 7, the invisible information addition process S106 is performed after the color conversion process S104. The modified image print process in the variation of the exemplary embodiment of the invention differs from the above-described exemplary embodiment of the invention in that, in the variation, as shown in FIG. 18, the position at which invisible information is added S304 is prior to the color conversion process S306. Thus, a brief explanation is given of the image print process according to this variation. First, similar to the image print process of the exemplary embodiment of the invention, image data is read S300. Then the resolution of the read image data into print resolution is converted S302. Next, the invisible information embedding process S304 is performed.

Figure 19:
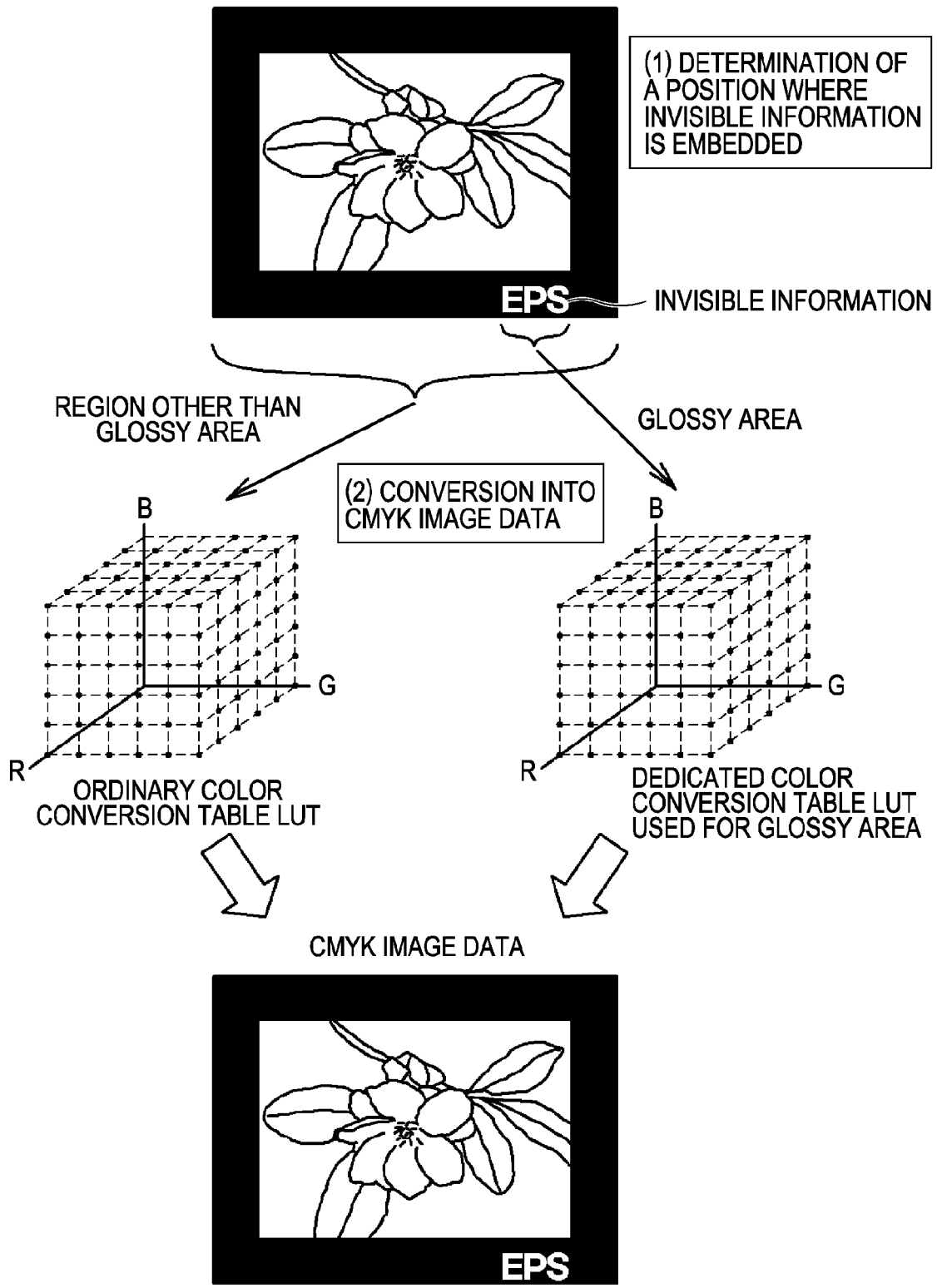
FIG. 19 illustrates the embedding of the invisible information into the object image according to the variation example of the exemplary embodiment of the invention shown in FIG. 18.

FIG. 19 is illustrates the image print process according to the variation example of the invention, wherein the color conversion process S306 is performed after the determination of the embedment position of the invisible information S304. As illustrated in FIG. 19, prior to the color conversion of the image data, the embedment position of the invisible information is determined. The position at which the invisible information is going to be embedded may be determined by a user through manipulation of the operation panel 300, or may be preset in the ROM of the control circuit 260, as explained in the foregoing exemplary embodiment of the invention. After determining the embedment position of the invisible information, the color conversion process is performed to convert the RGB image data into the CMYK image data. When converting the RGB image data into the CMYK image data, one type of conversion process is applied to an area that should have greater surface gloss (glossy area) and another type of conversion process is applied to other area on a discrete basis. First of all, any region other than the glossy area is subjected to color conversion process by means of the color conversion table LUT just in the same manner as done in usual color conversion process. On the other hand, a different color conversion process, which is not the same as one that is applied to the non-glossy region, is applied to the glossy area, shown as the character portion of "EPS" in this example. A few non-limiting examples of the color conversion method that may be applied to the glossy area are illustrated in FIG. 19, as a dedicated color conversion table LUT that is exclusively used for glossy color, such as real black, may be used for color conversion. In another example dedicated CMYK values for glossy color such as real black may be set in advance so that the data of the glossy area can be converted into the preset CMYK values. By this means, data is converted into the glossy CMYK values for the glossy area, whereas it is converted into the non-glossy CMYK values by the color conversion table LUT for the non-glossy region other than the glossy area. Therefore, it is possible to embed the invisible information in the object image by utilizing a difference in the surface gloss of the image. Similar to the previously described image print process according to the exemplary embodiment of the invention does, the modified image print process of the invention also makes it possible to output a printed image in which invisible information is embedded, which can be visually recognized on the basis of a difference in the surface gloss thereof.

VI. Variation Example 2

Figure 20:
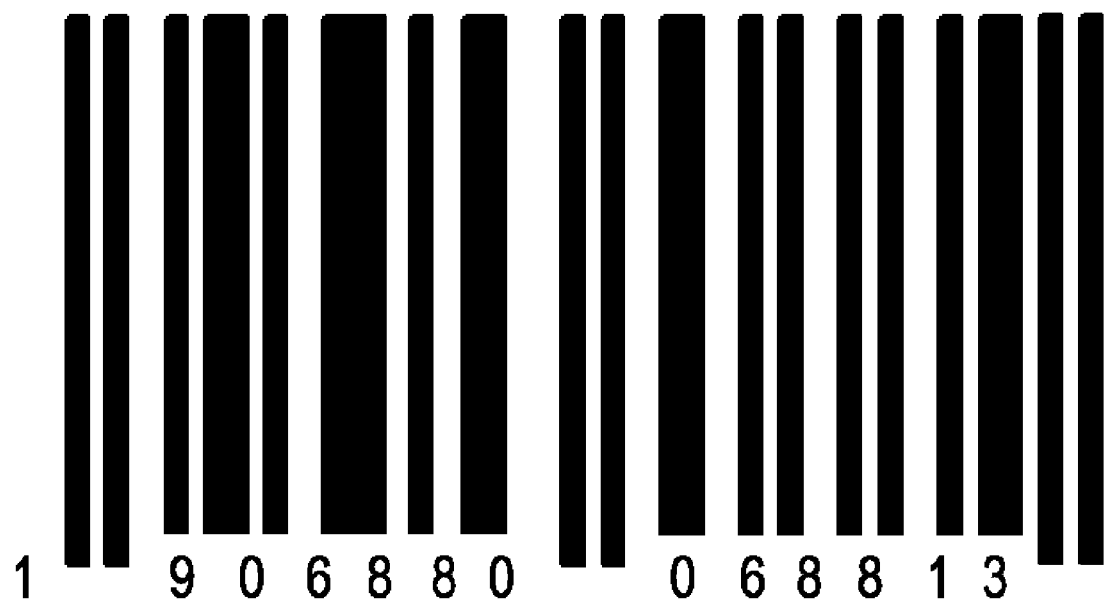
FIG. 20 is a schematic diagram that illustrates an example of a bar code that is printed by the printing apparatus according to embodiments of the invention.

The printing apparatus of the exemplary embodiment and variation of the invention can be applied not only to images such as one illustrated in FIG. 17 but also to various kinds of printed literature, printed material, and the like. FIG. 20 is an explanatory diagram that illustrates an example of a bar code that is printed by using the printing apparatus according to this variation example of the invention. A bar code is data that records numerical values that are represented by the intervals and thickness of bars that are printed in black. Such bar codes, which are now widely used, are typically printed on the package of various kinds of goods for the purpose of inventory control, price control, and the like. A logo mark, product explanation, manufacturer's identification mark, and the like are usually printed on the package of goods. Needless to say, it is typically not possible to print any logo mark or the like on the area at which a bar code is printed because it becomes impossible to read the bar code if any logo or the like is printed on the bar code. However, the printing apparatus according to this variation example of the invention makes it possible to embed a logo or the like in the bar code portion by taking advantage of the difference in surface gloss between real black and composite black.

Figure 21A:
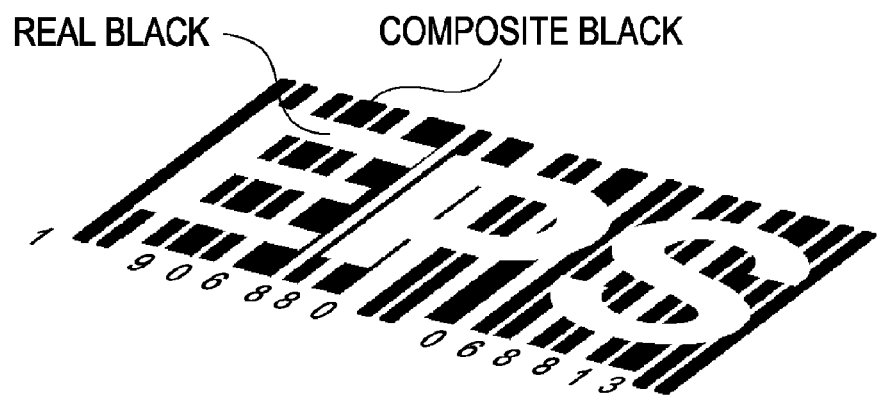
FIGS. 21A-21C are a set of diagrams that illustrate an example of a bar code in which a logo or another bar code may be embedded by the printing apparatus according to embodiments of the invention.
Figure 21B:
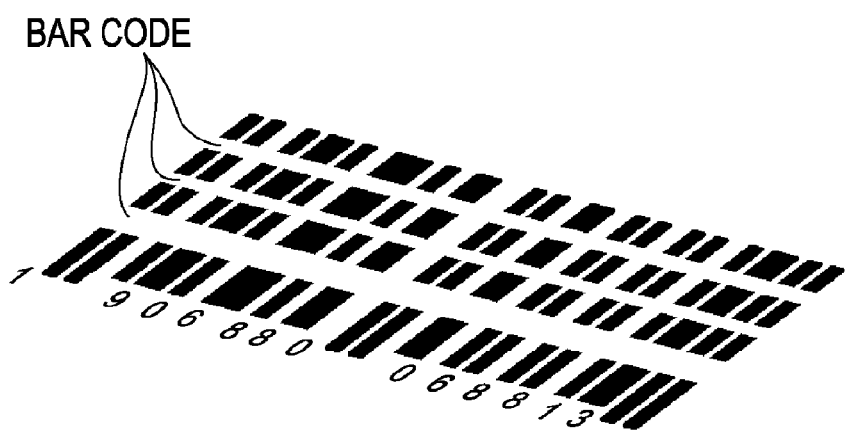
Figure 21C:
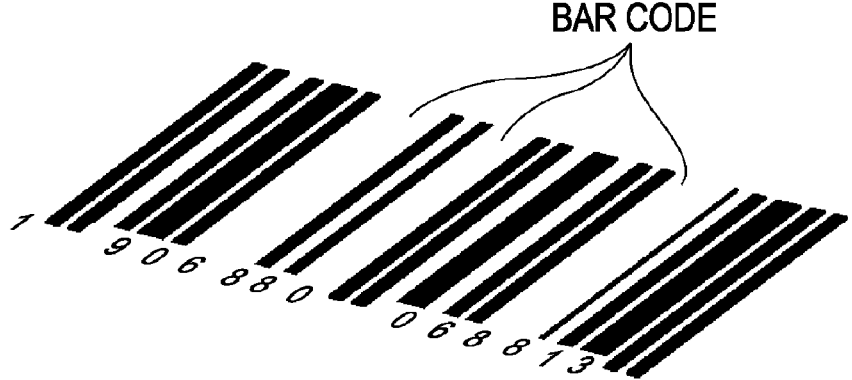

FIG. 21A illustrates an example of a bar code in which a logo is embedded. As illustrated in the drawing, in this example, the character portion of the logo is printed in real black whereas the remaining portion is printed in composite black. In this way, the logo is embedded by utilizing the differences in surface gloss. As explained above, the printing apparatus according to this variation example of the invention makes it possible to embed a logo or the like into a conventional bar code whose usefulness has previously been limited to the recording of numerical values so far. Therefore, it becomes possible to use such a logo-embedded bar code for unsophisticated authentication, advertisement, in addition to various other kinds of conceivable applications. In addition, the target of embedment is not restricted to logos. For example, as illustrated in FIG. 21B and FIG. 21C, a bar code may be embedded into another bar code by taking advantage of the differences in surface gloss. Even when another information is embedded in a bar code, it is still possible to scan and read the numerical values recorded therein in the same manner as done for other ordinary bar codes because, at first glance, the information-embedded bar code has the same appearance as that of the ordinary bar codes, and appears as shown in FIG. 20.

VII. Variation Example 3

In the two embodiments described above, invisible information that is embedded in an object image is assumed to be a "one-color" image that does not have any intermediate gradations or halftone. Notwithstanding the foregoing examples, however, the invention is not exclusively limited to one-color images but may be modified to embed any halftone images with intermediate gradations. For example, in a situation where invisible information is printed in real black while the background is printed in composite black, it is possible to embed a halftone image that has intermediate gradations, by controlling the percentage of the area that is occupied by real black.

Figure 22A:
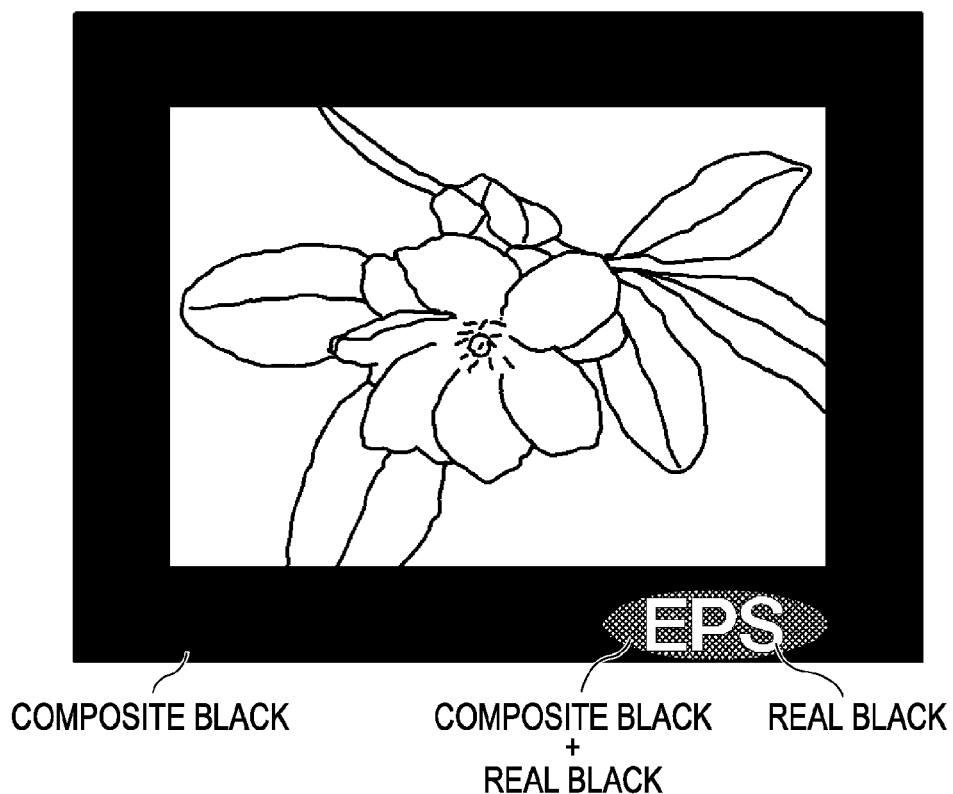
FIGS. 22A and 22B are a set of schematic diagrams that illustrate an example of an embedded halftone image that has intermediate gradations.
Figure 22B:
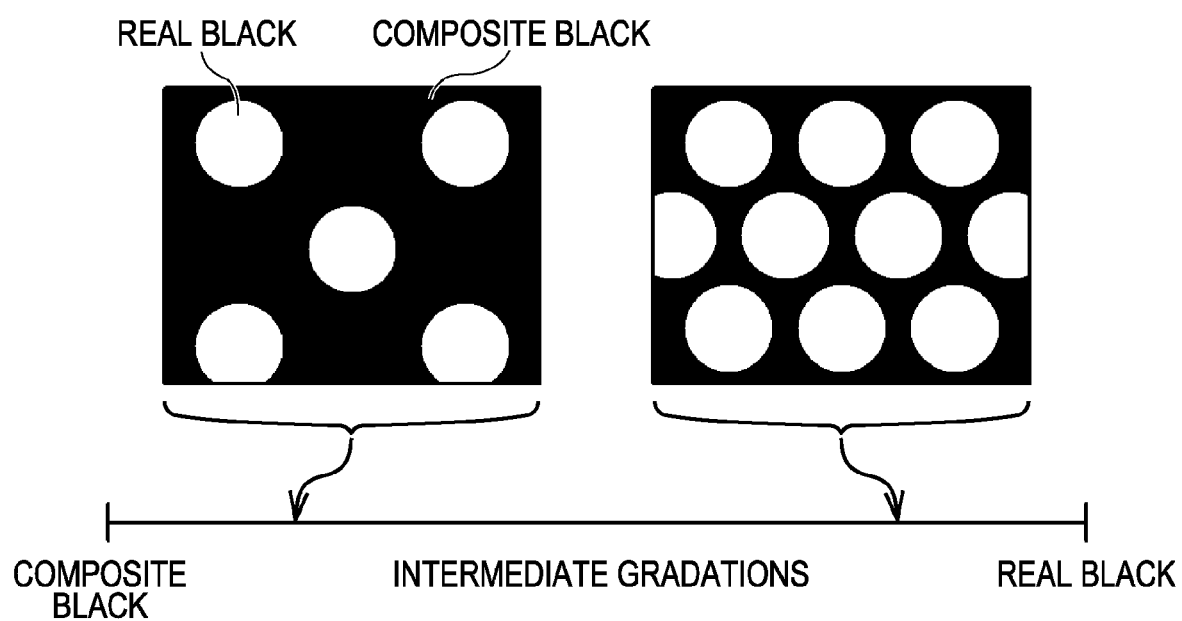

FIGS. 22A and 22B illustrate an example of an embedded halftone image with intermediate gradations. As illustrated in FIG. 22A, the frame-like portion painted in black is printed in composite black, whereas the character portion of "EPS" is printed in real black. On the other hand, the background portion of the "EPS" around the character portion thereof inside the ellipse, which is shown as a hatched area in the drawing, is represented in intermediate gradations. Specifically, it is represented in intermediate gradations by controlling the density of small points such as dots printed in real black against the background thereof printed in composite black.

FIG. 22B illustrates an example of intermediate gradations represented by dots. As illustrated in the drawing, the left-hand dot density pattern has a different percentage of area that is occupied by the dots printed in real black from that of the right-hand dot density pattern. If the percentage of area that is occupied by the dots printed in real black is small, and thus, if the percentage of area that is represented in composite black is large (e.g., left-hand dot density pattern), then the printed area offers tone, surface gloss, or the like that resembles or is relatively close to that of pure composite black. As the area percentage of the real black dots increases (e.g., right-hand dot density pattern), the tone, surface gloss, or the like of the printed area becomes closer to that of pure real black. As understood from the above, it is possible to represent intermediate gradations by controlling the relative percentage of real black and composite black. Therefore, even an image having intermediate gradations can be embedded into another object image for printing.

In another variation, some pixels that are printed in real black and other pixels that are printed in composite black may be mixed so as to form a region that has a mixed intermediate tone, surface gloss, or the like between real black and composite black. Such an alternative configuration also makes it possible to embed an image having intermediate gradations.

Although the printing apparatus according to the exemplary embodiments and the variation examples of the present invention are described above, the invention is in no way restricted to these exemplary embodiments and variation examples. Thus, the present invention may be configured and/or implemented in a variety of ways, adaptations, and modifications without departing from the spirit and scope of the invention.

What is claimed is:

1. An image data conversion apparatus capable of receiving image data for a first image, converting the image data into ink quantity data that corresponds to the quantities of a plurality of types of ink that may be used for printing the first image, the image data conversion apparatus comprising:
    an embedded image acquisition section that is capable of acquiring a second image that is to be embedded into the first image;
    an embedment area acquisition section that is capable of receiving a determination indicating the location of an embedment area where the second image will be embedded in the first image;
    an ink quantity memory section that is capable of storing a first set of ink quantity data that represents a plurality of types of ink and associated quantities that may be used to print an image along with a second set of ink quantity data that comprises a second set of ink and associated quantities that may be substituted for the first set of ink quantities; and
    an ink amount data conversion section that is capable of converting the image data into converted ink quantity data corresponding to the image data, such that the second image embedded in the embedment area can be observed by making a differentiation between a portion of the first image where the first set of ink is used and another portion of the first image where the second set of ink is used.

2. The image data conversion apparatus according to claim 1, wherein the embedment area acquisition section receives the determination indicating the location of an embedment area from outside the image data conversion apparatus.

3. The image data conversion apparatus according to claim 2, wherein the determination indicating the location of an embedment area is user defined.

4. The image data conversion apparatus according to claim 1, wherein after converting the image data into the converted ink quantity data, the ink amount data conversion section replaces the ink amount data corresponding to the first set of ink quantity data with the second set of ink quantity data, when process the ink quantity data associated with the second image in the embedment area, so as to obtain converted ink quantity data which includes the embedded second image.

5. The image data conversion apparatus according to claim 1, wherein the ink amount data conversion section converts the image data into the converted ink quantity data by selecting the second set of ink quantity data from a predetermined set of ink quantity data, so as to obtain converted ink amount data which includes the embedded second image.

6. The image data conversion apparatus according to claim 5, wherein the second set of ink quantity data are selected using a predetermined set of ink quantity data comprising a color conversion table.

7. The image data conversion apparatus according to claim 1, wherein the ink amount data conversion section is further capable of changing the size of the second image to correspond with the size of the embedment area and incorporating the resized second image into the converted ink quantity data.

8. The image data conversion apparatus according to claim 1, wherein the ink quantity memory section stores a set of ink quantities that represents the amount of ink of each kind of the plurality of chromatic color inks that may be mixed to represent an achromatic color along with an ink quantity that represents the amount of a single type of ink that may represent the same achromatic color ink.

9. The image data conversion apparatus according to claim 1, further comprising an image print section that is capable of outputting a printed image based on the converted ink quantity data.

10. A method for converting image data into ink quantity data corresponding to the amounts of a plurality of kinds of ink that may be used for printing a first image, the method comprising:
storing a second image that may be embedded into the first image;
acquiring a determination indicating the location of an embedment area where the second image will be embedded in the first image;
storing a first set of ink quantity data that represent a first plurality of inks and associated quantities and a second set of ink quantity data comprising a second plurality of inks and associated quantities that can be used as a substitute for the first set of ink quantities; and
converting the image data into converted ink quantity data corresponding to image data such that the second image embedded in the embedment area can be observed by making a differentiation between a portion of the first image where the first set of ink is used and another portion where the second set of ink is used.

11. The method according to claim 10, wherein the determination indicating the location of an embedment area is user defined.

12. The method according to claim 10, wherein converting the image data into converted ink quantity data comprises replacing the ink amount data corresponding to the first set of ink quantity data with the second set of ink quantity data when process the ink quantity data associated with the second image in the embedment area.

13. The method according to claim 10, wherein converting the image data into converted ink quantity data further comprises converting the image data by selecting the second set of ink quantity data from a predetermined set of ink quantity data.

14. The method according to claim 13, wherein the second set of ink quantity data are selected using a predetermined set of ink quantity data comprising a color conversion table.

15. The method according to claim 10, wherein converting the image data into converted ink quantity data further comprises changing the size of the second image to correspond with the size of the embedment area and incorporating the resized second image into the converted ink quantity data.

16. The method according to claim 10, wherein storing the first and second set of ink quantities comprises storing a first set of ink quantities that represent the amounts of ink of each kind of the plurality of chromatic color inks that may be mixed to represent an achromatic color along with a second set of ink quantities that represent the amount of a single type of ink that may represent the same achromatic color ink as the first set of ink quantities.

17. The method according to claim 10, further comprising outputting a printed image based on the converted ink quantity data.

18. A computer program stored in a computer readable medium for executing a method within a computer which includes a readable medium, the computer program being used for converting image data into ink quantity data that corresponds to the quantities of a plurality of kinds of ink that may be used for printing a first image associated with the image data, the program comprising:
storing another image that is to be embedded into the first-mentioned image in the computer readable medium;
acquiring a determination indicating the location of an embedment area where the second image will be embedded in the first image;
storing a first set of ink quantity data that represent a first plurality of inks and associated quantities along with a second set of ink quantity data that represent a second plurality of inks and associated quantities that can be used as a substitute for the first set of inks in the computer readable medium; and
converting the image data into converted ink quantity data corresponding to the image data such that the second image embedded in the embedment area can be observed by making a differentiation between a portion of the first image where the first set of ink is used and another portion where the second set of ink is used the converted ink quantity data being converted using an ink amount data conversion module of the computer.

* * * * *